(12) United States Patent
Lloyd et al.

(10) Patent No.: US 7,487,237 B2
(45) Date of Patent: Feb. 3, 2009

(54) LOAD OPTIMIZATION

(75) Inventors: Michael A. Lloyd, Belmont, CA (US);
Mansour J. Karam, Mountain View, CA (US); Jose-Miguel Puildo Villaverde, Palo Alto, CA (US); Sean P. Finn, Belmont, CA (US); Omar C. Baldonado, Palo Alto, CA (US); James G. McGuire, San Francisco, CA (US); Herbert S. Madan, Tiburon, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 785 days.

(21) Appl. No.: 10/358,681

(22) Filed: Feb. 4, 2003

(65) Prior Publication Data
US 2004/0205098 A1 Oct. 14, 2004

Related U.S. Application Data

(63) Continuation-in-part of application No. PCT/US01/32476, filed on Oct. 17, 2001, and a continuation-in-part of application No. PCT/US01/32312, filed on Oct. 17, 2001, and a continuation-in-part of application No. PCT/US01/31259, filed on Oct. 5, 2001, and a continuation-in-part of application No. PCT/US01/31420, filed on Oct. 4, 2001, and a continuation-in-part of application No. PCT/US01/31419, filed on Oct. 4, 2001, which is a continuation-in-part of application No. 09/960,623, filed on Sep. 20, 2001, now Pat. No. 7,349,994, and a continuation-in-part of application No. 09/923,924, filed on Aug. 6, 2001, now Pat. No. 7,406,539, and a continuation-in-part of application No. 09/903,423, filed on Jul. 10, 2001, now Pat. No. 7,363,367, and a continuation-in-part of application No. 09/903,441, filed on Jul. 10, 2001, now Pat. No. 7,080,161.

(60) Provisional application No. 60/241,450, filed on Oct. 17, 2000, provisional application No. 60/275,206, filed on Mar. 12, 2001, provisional application No. 60/354,588, filed on Feb. 4, 2002.

(51) Int. Cl.
*G06F 15/173* (2006.01)
*G06F 9/46* (2006.01)
(52) U.S. Cl. ...................... 709/224; 718/105
(58) Field of Classification Search ................ 709/224; 718/105
See application file for complete search history.

(56) References Cited

U.S. PATENT DOCUMENTS 4,284,852 A 8/1981 Szybicki et al.

(Continued)

FOREIGN PATENT DOCUMENTS

EP 0 504 537 3/1991

(Continued)

OTHER PUBLICATIONS

Papadopoulos, Constantinos, et al., "Microprocessing and Microprogramming", *Protection and Routing Algorithms for Network Management*, Sep. 1993, vol. 38, Nos. 1/5, pp. 163-170.

(Continued)

*Primary Examiner*—William C. Vaughn, Jr.
*Assistant Examiner*—Joseph Maniwang
(74) *Attorney, Agent, or Firm*—Haverstock & Owens LLP

(57) ABSTRACT

Methods, computer code, and means are described that can control load in a network. In some applications, the monetary cost of operating the network can be reduced. Utilization of links in the network can be monitored. A degree of suboptimality with respect to some criteria can be assessed. In some instances, the criteria could be based at least partly one or more monetary billing structures of some subset of two or more links. A subset of the forwarding decisions of one or more forwarding nodes in the network can be adjusted automatically, based at least partly on the assessing. The adjustment can attempt to reduce the degree of suboptimality.

64 Claims, 8 Drawing Sheets

U.S. PATENT DOCUMENTS

| | | | |
|---|---|---|---|
| 4,345,116 A | 8/1982 | Ash et al. | |
| 4,495,570 A | 1/1985 | Kitajima et al. | |
| 4,594,704 A | 6/1986 | Ollivier | |
| 4,669,113 A | 5/1987 | Ash et al. | |
| 4,704,724 A | 11/1987 | Krishnan et al. | |
| 4,726,017 A | 2/1988 | Krum et al. | |
| 4,748,658 A | 5/1988 | Gopal et al. | |
| 4,788,721 A | 11/1988 | Krishnan et al. | |
| 4,839,798 A | 6/1989 | Eguchi et al. | |
| 4,901,244 A | 2/1990 | Szeto | 364/481 |
| 4,920,432 A | 4/1990 | Eggers et al. | |
| 4,931,941 A | 6/1990 | Krishnan | |
| 4,939,726 A | 7/1990 | Flammer et al. | |
| 4,949,187 A | 8/1990 | Cohen | |
| 4,949,248 A | 8/1990 | Caro | |
| 5,142,570 A | 8/1992 | Chaudhary et al. | |
| 5,172,413 A | 12/1992 | Bradley et al. | |
| 5,253,341 A | 10/1993 | Rozmanith et al. | |
| 5,287,537 A | 2/1994 | Newmark et al. | |
| 5,291,554 A | 3/1994 | Morales | |
| 5,341,477 A | 8/1994 | Pitkin et al. | |
| 5,343,463 A | 8/1994 | van Tetering et al. | 370/13 |
| 5,371,532 A | 12/1994 | Gelman et al. | |
| 5,375,070 A | 12/1994 | Hershey et al. | |
| 5,406,502 A | 4/1995 | Haramaty et al. | |
| 5,410,343 A | 4/1995 | Coddington et al. | |
| 5,414,455 A | 5/1995 | Hooper et al. | |
| 5,442,389 A | 8/1995 | Blahut et al. | |
| 5,442,390 A | 8/1995 | Hooper et al. | |
| 5,442,749 A | 8/1995 | Northcutt et al. | |
| 5,452,294 A | 9/1995 | Natarajan | |
| 5,467,345 A | 11/1995 | Cutler, Jr. et al. | 370/60 |
| 5,471,622 A | 11/1995 | Eadline | |
| 5,475,615 A | 12/1995 | Lin | |
| 5,477,536 A | 12/1995 | Picard | |
| 5,508,732 A | 4/1996 | Bottomley et al. | |
| 5,515,511 A | 5/1996 | Nguyen et al. | |
| 5,519,435 A | 5/1996 | Anderson | |
| 5,521,591 A | 5/1996 | Arora et al. | |
| 5,528,281 A | 6/1996 | Grady et al. | |
| 5,535,195 A | 7/1996 | Lee | |
| 5,537,394 A * | 7/1996 | Abe et al. | 370/252 |
| 5,563,875 A | 10/1996 | Hefel et al. | |
| 5,590,126 A | 12/1996 | Mishra et al. | 370/329 |
| 5,629,930 A | 5/1997 | Beshai et al. | |
| 5,631,897 A | 5/1997 | Pacheco et al. | |
| 5,636,216 A | 6/1997 | Fox et al. | |
| 5,652,841 A | 7/1997 | Nemirovsky et al. | 395/201 |
| 5,654,958 A * | 8/1997 | Natarajan | 370/410 |
| 5,668,800 A | 9/1997 | Stevenson | |
| 5,675,741 A | 10/1997 | Aggarwal et al. | |
| 5,729,528 A * | 3/1998 | Salingre et al. | 370/230 |
| 5,754,639 A | 5/1998 | Flockhart et al. | |
| 5,787,253 A | 7/1998 | McCreery et al. | 395/200.61 |
| 5,793,976 A | 8/1998 | Chen et al. | |
| 5,802,106 A | 9/1998 | Packer | |
| 5,805,594 A | 9/1998 | Kotchey et al. | |
| 5,812,528 A | 9/1998 | VanDervort | 370/235 |
| 5,835,710 A | 11/1998 | Nagami et al. | |
| 5,841,775 A | 11/1998 | Huang | 370/422 |
| 5,845,091 A | 12/1998 | Dunne et al. | |
| 5,884,047 A | 3/1999 | Aikawa et al. | 395/200.68 |
| 5,892,754 A | 4/1999 | Kompella et al. | 370/236 |
| 5,940,478 A | 8/1999 | Vaudreuil et al. | 379/88.18 |
| 5,974,457 A | 10/1999 | Waclawsky et al. | |
| 6,006,264 A | 12/1999 | Colby et al. | |
| 6,009,081 A | 12/1999 | Wheeler et al. | |
| 6,012,088 A | 1/2000 | Li et al. | 709/219 |
| 6,026,441 A | 2/2000 | Ronen | |
| 6,052,718 A | 4/2000 | Gifford | 709/219 |
| 6,064,946 A | 5/2000 | Beerends | 702/57 |
| 6,069,889 A | 5/2000 | Feldman et al. | |
| 6,078,963 A | 6/2000 | Civanlar et al. | 709/238 |
| 6,108,703 A | 8/2000 | Leighton et al. | |
| 6,111,881 A | 8/2000 | Soncodi | |
| 6,119,235 A | 9/2000 | Vaid et al. | |
| 6,130,890 A | 10/2000 | Leinwand et al. | |
| 6,167,052 A | 12/2000 | McNeill et al. | |
| 6,173,324 B1 | 1/2001 | D'Souza | |
| 6,178,448 B1 | 1/2001 | Gray et al. | 709/224 |
| 6,185,598 B1 | 2/2001 | Farber et al. | |
| 6,185,601 B1 * | 2/2001 | Wolff | 709/203 |
| 6,189,044 B1 | 2/2001 | Thomson et al. | 709/242 |
| 6,275,470 B1 | 8/2001 | Ricciulli | |
| 6,282,562 B1 | 8/2001 | Sidi et al. | |
| 6,286,045 B1 | 9/2001 | Griffiths et al. | |
| 6,292,832 B1 | 9/2001 | Shah et al. | 709/226 |
| 6,311,144 B1 | 10/2001 | Abu El Ata | 703/2 |
| 6,339,595 B1 | 1/2002 | Rekhter et al. | |
| 6,341,309 B1 | 1/2002 | Vaid et al. | |
| 6,363,332 B1 | 3/2002 | Rangarajan et al. | 702/185 |
| 6,385,198 B1 | 5/2002 | Ofek et al. | 370/389 |
| 6,385,643 B1 | 5/2002 | Jacobs et al. | 709/203 |
| 6,415,323 B1 | 7/2002 | McCanne et al. | |
| 6,426,955 B1 | 7/2002 | Gossett Dalton, Jr. et al. | 370/401 |
| 6,434,606 B1 | 8/2002 | Borella et al. | |
| 6,438,592 B1 | 8/2002 | Killian | |
| 6,446,028 B1 | 9/2002 | Wang | 702/186 |
| 6,452,950 B1 | 9/2002 | Ohlsson et al. | |
| 6,453,356 B1 | 9/2002 | Sheard et al. | 709/231 |
| 6,463,454 B1 | 10/2002 | Lumelsky et al. | |
| 6,493,353 B2 | 12/2002 | Kelly et al. | 370/467 |
| 6,522,627 B1 | 2/2003 | Mauger | 370/230 |
| 6,526,056 B1 | 2/2003 | Rekhter | |
| 6,538,416 B1 | 3/2003 | Hahne et al. | 320/431 |
| 6,556,582 B1 | 4/2003 | Redi | 370/443 |
| 6,560,204 B1 | 5/2003 | Rayes | 370/253 |
| 6,594,307 B1 | 7/2003 | Beerends | 375/224 |
| 6,601,098 B1 | 7/2003 | Case et al. | |
| 6,601,101 B1 | 7/2003 | Lee et al. | 709/227 |
| 6,608,841 B1 | 8/2003 | Koodli | |
| 6,611,872 B1 | 8/2003 | McCanne | |
| 6,614,789 B1 | 9/2003 | Yazdani et al. | 370/392 |
| 6,625,648 B1 | 9/2003 | Schwaller et al. | |
| 6,631,419 B1 | 10/2003 | Greene | |
| 6,633,640 B1 | 10/2003 | Cohen et al. | |
| 6,687,229 B1 | 2/2004 | Kataria et al. | 370/238 |
| 6,704,768 B1 | 3/2004 | Zombek et al. | 709/201 |
| 6,707,824 B1 | 3/2004 | Achilles et al. | 370/412 |
| 6,711,152 B1 | 3/2004 | Kalmanek, Jr. et al. | 370/351 |
| 6,714,549 B1 | 3/2004 | Phaltankar | |
| 6,714,896 B1 | 3/2004 | Barrett | 702/189 |
| 6,728,484 B1 | 4/2004 | Ghani | 398/42 |
| 6,728,779 B1 | 4/2004 | Griffin et al. | 709/239 |
| 6,735,177 B1 | 5/2004 | Suzuki | 370/238 |
| 6,748,426 B1 | 6/2004 | Shaffer et al. | |
| 6,751,562 B1 | 6/2004 | Blackett et al. | 702/61 |
| 6,757,255 B1 | 6/2004 | Aoki et al. | 370/252 |
| 6,760,775 B1 | 7/2004 | Anerousis et al. | 709/238 |
| 6,760,777 B1 | 7/2004 | Agarwal et al. | 709/238 |
| 6,766,381 B1 | 7/2004 | Barker et al. | |
| 6,795,860 B1 | 9/2004 | Shah | 709/229 |
| 6,801,502 B1 * | 10/2004 | Rexford et al. | 370/235 |
| 6,810,417 B2 | 10/2004 | Lee | 709/220 |
| 6,820,133 B1 | 11/2004 | Grove et al. | 709/238 |
| 6,826,613 B1 | 11/2004 | Wang et al. | 709/227 |
| 6,829,221 B1 | 12/2004 | Winckles et al. | 370/238 |
| 6,836,463 B2 | 12/2004 | Garcia-Luna-Aceves et al. | 370/238 |
| 6,839,745 B1 | 1/2005 | Dingari et al. | 709/219 |
| 6,839,751 B1 | 1/2005 | Dietz et al. | 709/224 |
| 6,912,222 B1 | 6/2005 | Wheeler et al. | 370/395.31 |
| 6,956,858 B2 | 10/2005 | Hariguchi et al. | 370/395.31 |

| | | | |
|---|---|---|---|
| 6,963,575 | B1 | 11/2005 | Sistanizadeh et al. ........ 370/404 |
| 6,963,914 | B1 | 11/2005 | Breitbart et al. ............. 709/226 |
| 6,973,490 | B1 | 12/2005 | Robertson et al. ........... 709/224 |
| 6,981,055 | B1 | 12/2005 | Ahuja et al. ................. 709/238 |
| 6,984,991 | B2 | 1/2006 | Ayyagari et al. ............. 370/325 |
| 6,999,432 | B2 | 2/2006 | Zhang et al. ................ 370/328 |
| 7,020,086 | B2 | 3/2006 | Juttner et al. ............... 370/238 |
| 7,024,475 | B1 | 4/2006 | Abaye et al. ................ 709/224 |
| 7,085,230 | B2 | 8/2006 | Hardy ........................ 370/232 |
| 7,099,282 | B1 | 8/2006 | Hardy ........................ 370/252 |
| 7,110,393 | B1 | 9/2006 | Tripathi et al. .............. 370/352 |
| 7,111,073 | B1 | 9/2006 | Jain et al. ................... 709/241 |
| 7,123,620 | B1 | 10/2006 | Ma ........................ 370/395.32 |
| 7,139,242 | B2 | 11/2006 | Bays .......................... 370/238 |
| 7,155,436 | B2 | 12/2006 | Hegde et al. .................. 707/10 |
| 7,162,539 | B2 | 1/2007 | Garcie-Luna-Aceves .... 709/242 |
| 7,269,157 | B2 | 9/2007 | Klinker et al. .............. 370/351 |
| 2001/0010059 | A1 | 7/2001 | Burman et al. .............. 709/224 |
| 2001/0026537 | A1 | 10/2001 | Massey ....................... 370/316 |
| 2001/0037311 | A1 | 11/2001 | McCoy et al. |
| 2002/0038331 | A1 | 3/2002 | Flavin |
| 2002/0101821 | A1 | 8/2002 | Feldmann et al. ........... 370/232 |
| 2002/0124100 | A1 | 9/2002 | Adams |
| 2002/0184527 | A1 | 12/2002 | Chun et al. .................. 713/201 |
| 2003/0016770 | A1 | 1/2003 | Trans et al. |
| 2003/0039212 | A1 | 2/2003 | Lloyd et al. ................. 370/235 |
| 2003/0112788 | A1 | 6/2003 | Erhart et al. ................ 370/345 |
| 2004/0030776 | A1 | 2/2004 | Cantrell et al. .............. 709/224 |
| 2004/0062267 | A1 | 4/2004 | Minami et al. .............. 370/463 |
| 2004/0218546 | A1 | 11/2004 | Clark ......................... 370/252 |
| 2005/0044270 | A1 | 2/2005 | Groove et al. ............... 709/238 |
| 2005/0083912 | A1 | 4/2005 | Asfar et al. ................. 370/352 |
| 2005/0132060 | A1 | 6/2005 | Mo et al. ..................... 709/227 |
| 2005/0201302 | A1 | 9/2005 | Gaddis et al. ............... 370/254 |
| 2005/0243726 | A1 | 11/2005 | Narendran ................... 370/238 |
| 2006/0026682 | A1 | 2/2006 | Zakas .......................... 726/22 |
| 2006/0036763 | A1 | 2/2006 | Johnson et al. ............. 709/224 |
| 2007/0271066 | A1 | 11/2007 | Nikitin et al. ............... 702/181 |
| 2008/0101793 | A1 | 5/2008 | Koch et al. ..................... 398/1 |

FOREIGN PATENT DOCUMENTS

| | | |
|---|---|---|
| EP | 0 528 075 A1 | 2/1993 |
| EP | 0 788 267 A2 | 8/1997 |
| EP | 0 598 969 B1 | 2/1999 |
| EP | 0 942 560 A2 | 9/1999 |
| EP | 0 982 901 A1 | 1/2000 |
| EP | 0 977 456 A2 | 2/2000 |
| EP | 0 999 674 A1 | 4/2004 |
| WO | WO 94/08415 | 4/1994 |
| WO | WO 99/06913 | 2/1999 |
| WO | WO 99/14907 | 3/1999 |
| WO | WO 99/14931 | 3/1999 |
| WO | WO 99/14932 | 3/1999 |
| WO | WO 99/18751 | 4/1999 |
| WO | WO 99/30460 | 6/1999 |
| WO | WO 99/39481 | 8/1999 |
| WO | WO 00/04458 | 1/2000 |
| WO | WO 00/25224 | 5/2000 |
| WO | WO 00/38381 | 6/2000 |
| WO | WO 00/45560 | 8/2000 |
| WO | WO 00/52906 | 9/2000 |
| WO | WO 00/62489 | 10/2000 |
| WO | WO 00/72528 A1 | 11/2000 |
| WO | WO 00/79362 A2 | 12/2000 |
| WO | WO 00/79730 A2 | 12/2000 |
| WO | WO 01/06717 A1 | 1/2001 |
| WO | WO 01/13585 A1 | 2/2001 |
| WO | WO 02/033896 A3 | 4/2002 |

OTHER PUBLICATIONS

Z. Wang et al., "Resource Allocation for Elastic Traffic: Architecture and Mechanisms," Conference Proceedings Article, 2000, XP010376681, pp. 159-169.

J. Yu, "Scalable Routing Design Principles," Ref. No. RFC 2791, Network Working Group, Jul. 31, 2000, pp. 1-26.

Paul Francis et al., "An Architecture for a Global Internet Host Distance Estimation Service," pp. 1-17.

T. Bates et al., "Multiprotocol Extensions for BGP-4", XP-00219077, Jun. 2000, pp. 1-10.

S. Kumar et al., "The MASC/BGMP Architecture for inter-domain Multicast Routing," 12 pages.

S. Berson et al., "An Architecture for Advance Reservations in the Internet," USC Information Sciences Institute, Jul. 16, 1998, pp. 1-21.

R. P. Draves et al., "Constructing Optimal IP Routing Tables," 1999 IEEE, 1-10.

R. Govindan et al., "An Analysis of Internet Inter-Domain Topology and Route Stability," USC Information Sciences Institute, 1997 IEEE, 8 pages.

V. Paxson, "Toward a Framework for Defining Internet Performance Metrics," http://www.isoc.org/inet96/proceedings/d3/d3_3.htm, pp. 1-20.

C. Alaettinoglu et al. "Routing Policy Specification Language (RPSL)," http://quimby-gnus.org/internet-drafts/draft-ietf-rps-rpsl-v2-00.txt, pp. 1-56.

P. Traina, "BGP-4 Protocol Analysis," Mar. 1995, pp. 1-10.

B. Krishnamurthy et al., "On Network-Aware Clustering of Web Clients," 14 pages.

Sami Iren et al., "The Transport Layer: Tutorial and Survey", XP-002210446, ACM Computing Surveys, vol. 31, No. 4, Dec. 1999, pp. 360-405.

D. B. Ingham et al., "Supporting Highly Manageable Web Services", Computer Networks and ISDN Systems 29 (1997), pp. 1405-1416.

Yasushi Saito et al., "Manageability, Availability and Performance in Porcupine: A Highly Scalable, Cluster-Based Mail Service", 17th ACM Symposium on Operating System Principles, pp. 1-15, Dec. 1999.

Nikolaos Skarmeas et al., "Content Based Routing as the Basis for Intra-Agent Communication", Department of Computing Imperial College London.

Nikolaos Skarmeas et al., "Intelligent Routing Based on Active Patterns as the Basis for the Integration of Distributed Information Systems", Department of Computing Imperial College London, Feb. 1997.

"A Longest Prefix Match Search Engine for Multi-Gigabit IP Processing", Masayoshi Kobayashi et al., C&C Media Research Laboratories, NEC Corporation, pp. 1360-1364, 2000 IEEE.

"Internet Protocol" from Nortel Networks, www.arvelo.net/net-bay-ip.html. Apr. 6, 2005, 26 pages.

Nick Feamster et al., "Controlling the Impact of BGP Policy Changes on IP Traffic", Nov. 6, 2001, pp. 1-18.

Dean Jones, "Developing Shared Ontologies in Multi-Agent Systems", pp. 1-10.

L. Massoulié et al., "Arguments in favour of admission control for TCP flows", pp. 1-16.

Murthy, Shree, et al, "A loop-free routing protocol for large-scale internets using distance vectors," Mar. 14, 2007, pp. 147-161, Computer Communications.

Bouloutas, A. et al., "Some Graph Partitioning Problems and Algorithms Related to Routing in Large Computer Networks," International Conference on Distributed Computing Systems, Newport Beach, Jun. 5-9, 1989, pp. 362-370, Washington, IEEE Comp. Soc. Press, US.

Yositusugu, Ohmae et al, "Dividing Method for Topological Design of Corporate Communication Networks," Aug. 1, 1992, pp. 54-62, Communications, Wiley Hoboken, NJ, US.

D. New, "RFC 3620, The TUNNEL Profile," Oct. 2003, The Internet Society.

* cited by examiner

LOAD OPTIMIZATION

CROSS-REFERENCE TO RELATED APPLICATIONS

This application claims priority to U.S. Provisional Application No. 60/354,588 filed, Feb. 4, 2002, which is incorporated herein by reference in its entirety.

Also this application is a continuation-in-part of the National Stage of PCT Application No. PCT/US01/32476, filed Oct. 17, 2001; and is a continuation-in-part of PCT Application No. PCT/US01/32312, filed Oct. 17, 2001; PCT Application No. PCT/US01/31259, filed Oct. 5, 2001; PCT Application No. PCT/US01/31420, filed Oct. 4, 2001; and PCT Application No. PCT/US01/31419, filed Oct. 4, 2001; which are continuations-in-part of U.S. application Ser. No. 09/960,623, filed Sep. 20, 2001 now U.S. Pat. No. 7,349,994; U.S. application Ser. No. 09/903,423, filed Jul. 10, 2001 now U.S. Pat. No. 7,363,367; U.S. application Ser. No. 09/923,924, filed Aug. 6, 2001 now U.S. Pat. No. 7,406,539; and U.S. application Ser. No. 09/903,441, filed Jul. 10, 2001 now U.S. Pat. No. 7,080,161; which claim the benefit of U.S. Provisional Application No. 60/275,206, filed Mar. 12, 2001; and U.S. Provisional Application No. 60/241,450, filed Oct. 17, 2000. These applications are hereby incorporated by reference.

BACKGROUND OF THE INVENTION

By changing the forwarding decision of a network, a network user can decrease the cost of using the network, or otherwise enhance the load distribution of the network. One approach to decreasing the cost of using the network is for a person to periodically intervene and adjust the forwarding decisions of the network.

Unfortunately, manually adjusting the forwarding decisions of particular network nodes is an imperfect solution. First, manual adjustments are labor intensive. Second, manual adjustments are slow. Because of the dynamic nature of network traffic, manual adjustments that may have had the result of decreasing cost at one point in time may not have the effect of decreasing cost at a later time—or worse, even increase the cost.

Another difficulty with adjusting forwarding decisions is that monetary billing structures can be complicated, such as when the monetary billing structure is not flat. Particularly when multiple monetary billing structures (e.g., of multiple providers such as internet service providers) of multiple links are considered with the dynamic nature of network traffic, correctly adjusting forwarding decisions while attempting to decrease the cost of using the network can present a significant challenge.

What is needed is an effective solution for adjusting the load distribution in a network, for example to decrease the cost of using the network.

BRIEF SUMMARY OF THE INVENTION

Some embodiments of the invention control load in a network. Some embodiments of this invention reduce the monetary cost of operating the network. Some embodiments, include at least part of one or more of:

Monitoring at least a first utilization of a first subset of two or more links in the network Assessing the degree of suboptimality with respect to some criteria. In some instances, the criteria could be based at least partly one or more monetary billing structures of a second subset of two or more links, wherein:

at least one of the one or more monetary billing structures receives as input at least a second utilization of the second subset of two or more links, at least one of the one or more monetary billing structures includes variable cost, and the first utilization of the first subset of two or more links is at least partly indicative of the second utilization of the second subset of two or more links Adjusting automatically a subset of the forwarding decisions of one or more forwarding nodes in the network based at least partly on the assessing, wherein the adjusting attempts to reduce the degree of suboptimality.

In some embodiments of this invention, the steps of monitoring, assessing, and adjusting are independent—in such embodiments, no causal relationship exists between the steps of monitoring, assessing, and adjusting.

In some embodiments of this invention, adjustments can be made as to control load without excessively compromising performance. In some embodiments of this invention, the assessment of suboptimality is based at least partly on the monitoring, hence providing a closed loop system. (e.g., in such embodiments of the invention, the adjusting could affect load; the reading of the monitoring could then be reflected by the consequent changes in load, resulting in a modification in the results of the assessment, which in turn provokes new adjustments.) In other embodiments of this invention, the assessment of suboptimality is not necessarily based on the monitoring. In some embodiments of this invention, the steps of monitoring, assessing, and adjusting are continually repeated so that the latest information provided by the monitoring can be used in adjusting the forwarding decisions.

DETAILED DESCRIPTION OF THE INVENTION

Various embodiments of the invention include methods, software, hardware, and/or a combination.

The software can be on any of various program media, such as an optical medium (e.g., a DVD, CD), a magnetic medium (e.g., a floppy or hard disk), an electrical medium (e.g., flash), a nanoscale medium, or some combination. The software can also be in a transitory medium, such as an optical signal, magnetic signal, electrical signal, or some combination, such as an electromagnetic wave. The software can also be stored on a computer, such as on long term storage or short term storage, such as in volatile or nonvolatile memory.

The hardware can be any of various mechanisms, such as a computer, personal digital assistant, cell phone, or embedded device. The hardware may be implemented on program media such as an integrated circuit or chip that can be added to a computer.

Some embodiments are a combination of hardware and software, such as hardware with some of the instructions implemented in the hardware, combined with software for some of the instructions executing on the hardware.

Computer code in various embodiments can be implemented in hardware, software, or a combination of hardware and software.

Figure 1:
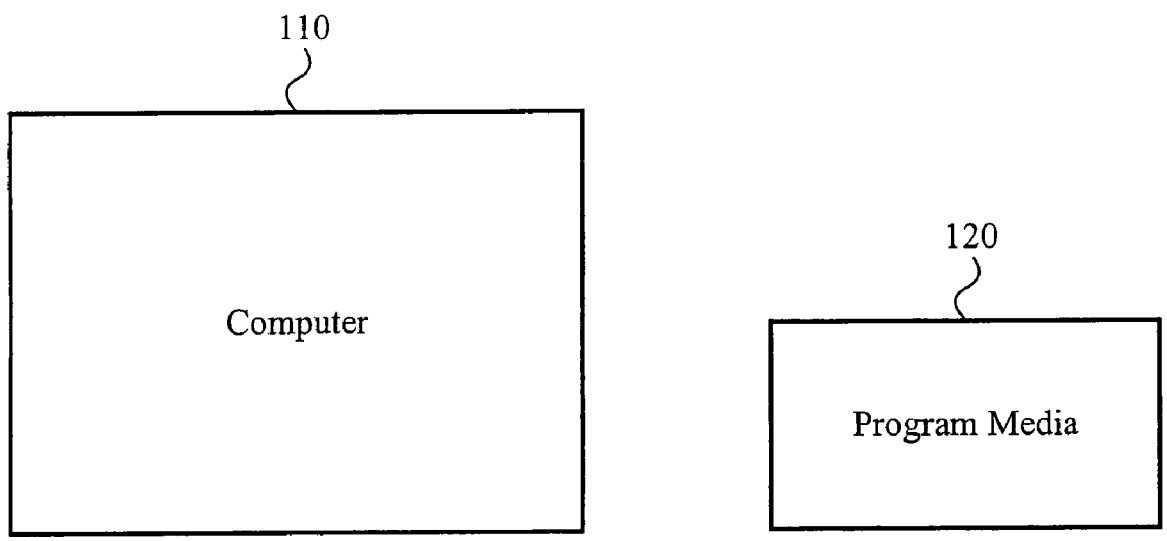
FIG. 1 illustrates a computer programmed from program media.

FIG. 1 illustrates a computer 110, which is programmed by code stored on program media 120. The program media 120 is used to place code on the computer 110.

Figure 2:
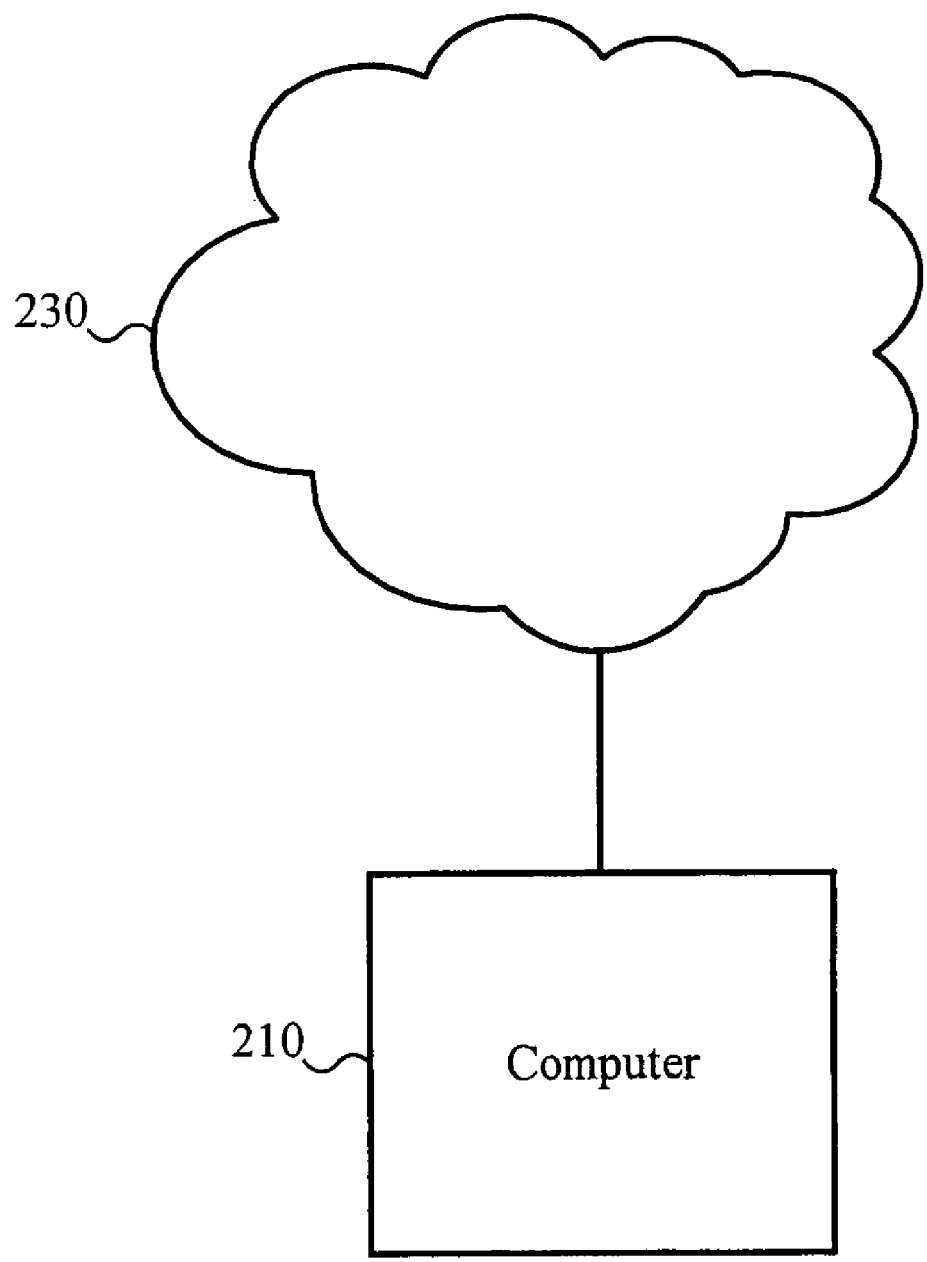
FIG. 2 illustrates a computer programmed from a network.
Figure 3:
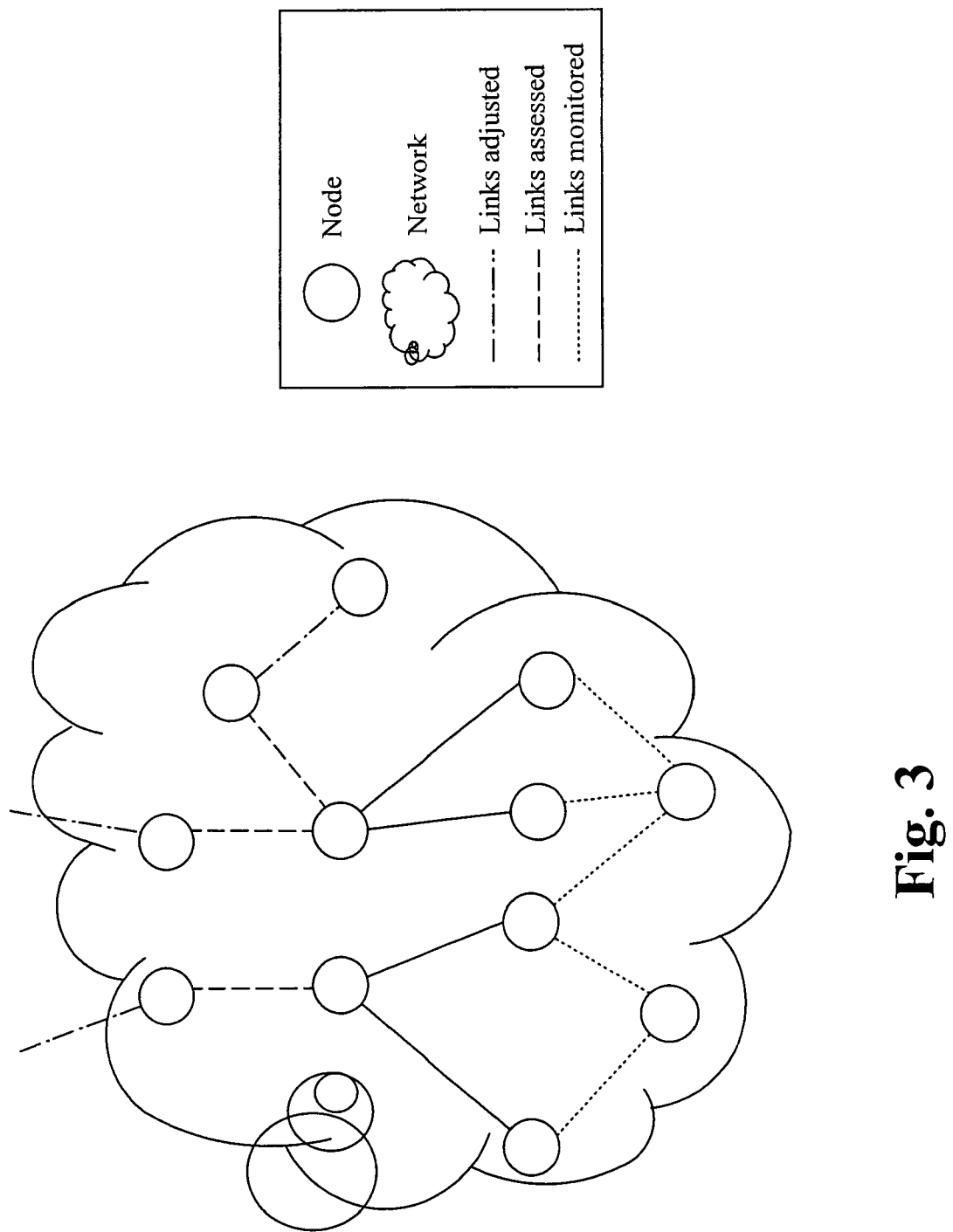
FIG. 3 illustrates a network with nodes and links that are adjusted, links that are assessed, and links that are monitored.
Figure 4:
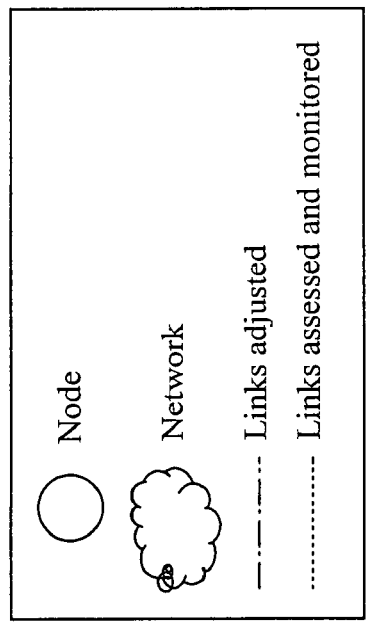
FIG. 4 illustrates a network with links that are both assessed and monitored.
Figure 4:
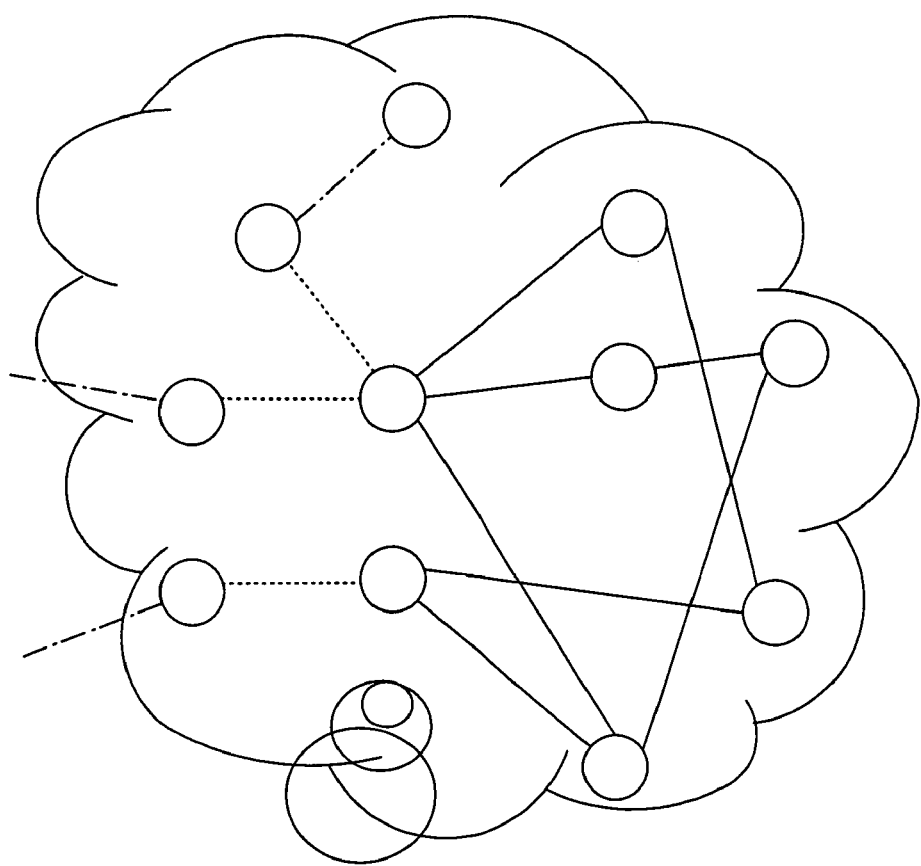
Figure 5:
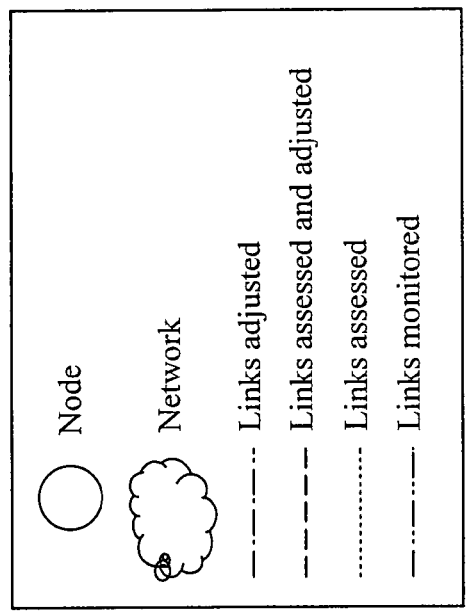
FIG. 5 illustrates a network with links that are both assessed and adjusted.
Figure 5:
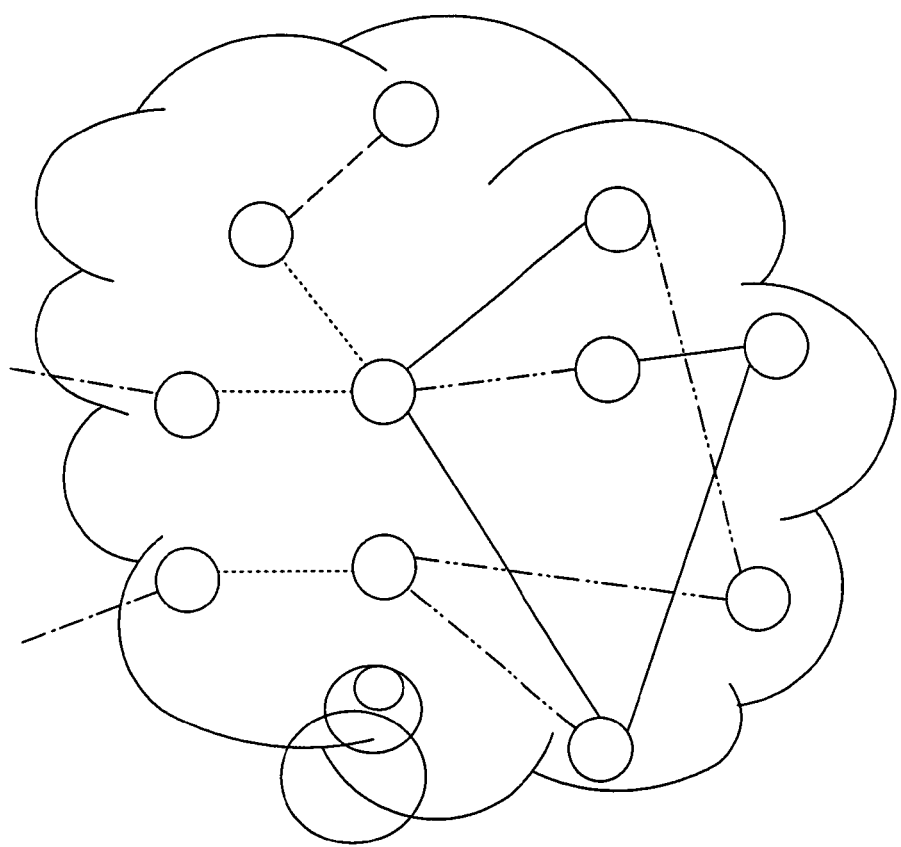
Figure 6:
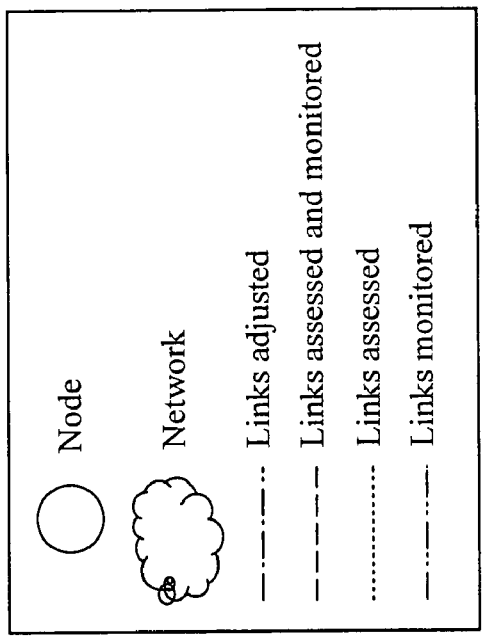
FIG. 6 illustrates a network with links that are both assessed and monitored, links that are assessed but not monitored, and links that are monitored but not assessed.
Figure 6:
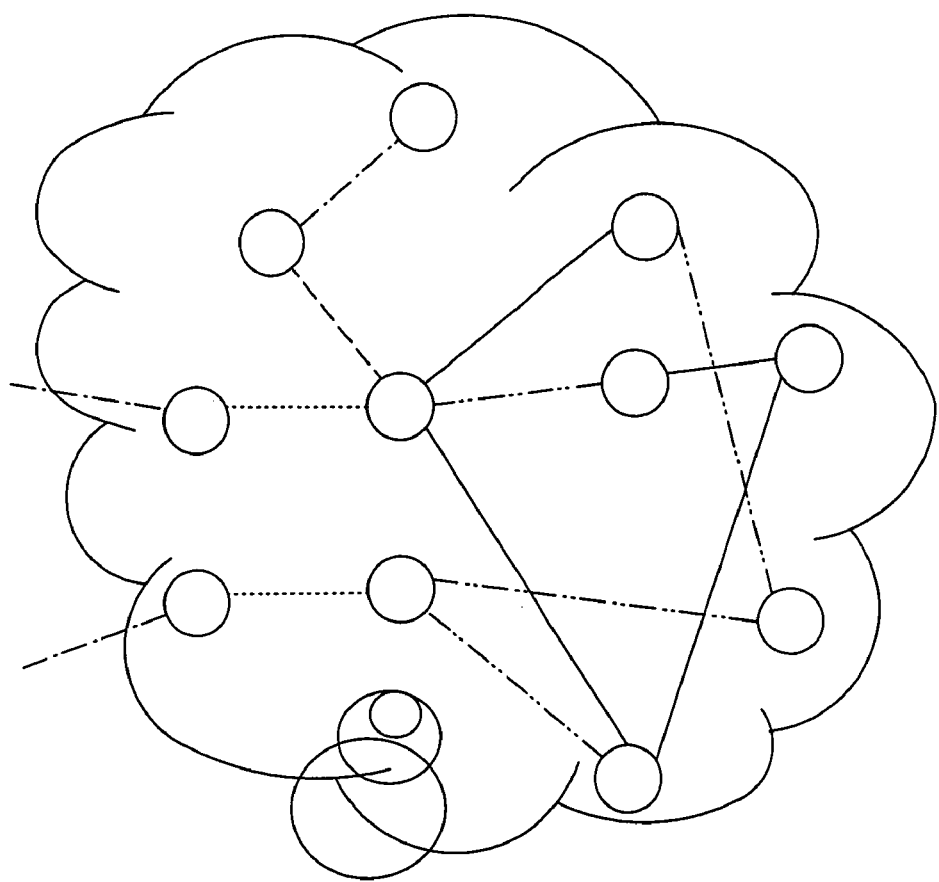

FIG. 2 illustrates a computer 210, which is programmed by code from a network 230. The network 230 is used to place code on the computer 210

In this document, we describe mechanisms that can be used to control load in a network.

In some embodiments of this invention, these mechanisms will be used to reduce the monetary cost of operating the network.

Some embodiments include at least part of one or more of:
- Monitoring at least a first utilization of a first subset of two or more links in the network
- Assessing the degree of suboptimality with respect to some criteria. In some instances, the criteria could be based at least partly one or more monetary billing structures of a second subset of two or more links, wherein:
  - at least one of the one or more monetary billing structures receives as input at least a second utilization of the second subset of two or more links,
  - at least one of the one or more monetary billing structures includes variable cost, and
  - the first utilization of the first subset of two or more links is at least partly indicative of the second utilization of the second subset of two or more links
- Adjusting automatically a subset of the forwarding decisions of one or more forwarding nodes in the network based at least partly on the assessing, wherein the adjusting attempts to reduce the degree of suboptimality.

In the following sections, we describe how, in some embodiments of the invention, the steps of monitoring, assessing, and adjusting would be performed.

In some embodiments of this invention, the steps of monitoring, assessing, and adjusting are independent—in such embodiments, no causal relationship exists between the steps of monitoring, assessing, and adjusting.

In some embodiments of this invention, adjustments can be made as to control load without excessively compromising performance. In some embodiments of this invention, the assessment of suboptimality is based at least partly on the monitoring, hence providing a closed loop system. (E.g., in such embodiments of the invention, the adjusting could affect load; the reading of the monitoring could then be reflected by the consequent changes in load, resulting in a modification in the results of the assessment, which in turn provokes new adjustments.) In other embodiments of this invention, the assessment of suboptimality is not necessarily based on the monitoring. In some embodiments of this invention, the steps of monitoring, assessing, and adjusting are continually repeated so that the latest information provided by the monitoring can be used in adjusting the forwarding decisions.

In some embodiments, load and utilization can be interrelated. Load can include a measure of traffic, for example, in bits per second, flowing across a resource. Utilization can include a measure of the load portion of resource capacity. For example, the load of a link could be 200 bits per second. If the link capacity is 500 bits per second, then the link utilization can be 200/500=0.4=40%. So in this case, for some embodiments, a load of 200 bits per second and a utilization of 40% are equivalent statements about the rate of traffic flowing through the link. In some embodiments, utilization can include an absolute portion without reference to the resource capacity, such as a load, rather than a relative portion with reference to the resource capacity. In some embodiments, utilization can include a relative portion of another value besides the resource capacity.

In some embodiments of this invention, monitoring is used to provide load information upon which, in some systems, the assessing will partly be based. In some embodiments of this invention, the monitoring uses the Simple Network Monitoring Protocol (SNMP); in other embodiments, the monitoring is based partly on flow information export. One such flow information export is NetFlow. In other embodiments of this invention, monitoring is based at least partly on a source external to the subset of forwarding decisions used in the adjusting. In some embodiments of this invention, the monitoring is based at least partly on span port.

In some embodiments, systems are included to deal with the case where monitoring is done for a subset of set of two or more links, but not for another subset of the two or more links. In some embodiments, in instances where SNMP is used for monitoring, systems are included to deal with timeouts in SNMP polling.

In some embodiments, monitoring can be done using bye counts over a time interval of specified length. In other embodiments, monitoring can be done using rates.

In some embodiments of the invention, a minimum limit is imposed on the number of utilization samples obtained from the monitoring before assessing can proceed.

In some embodiments of this invention, the method takes into account the load corresponding to subsets of the objects. In some such embodiments, the subsets of objects correspond to one or more prefixes. This information can be obtained through monitoring systems that will be recognized by the skilled in the field. Such mechanisms include NetFlow, RMONI/II, span port, and other external monitoring sources. Such monitoring systems can also include systems based at least partly on web server logs; for example, rate of requests per destination can be counted for different applications. If the subsets of objects include one or more prefixes, one can also use the size of the prefix as an estimate of the contribution of that prefix to the total utilization. For example, a/8 would be estimated to have twice the traffic than a/9, itself having twice the traffic of a/10.

In some embodiments of this invention, the monitoring combines the utilization samples in some fashion. In some embodiments of this invention, the monitoring estimates a percentile of load samples. In some embodiments, an estimation of the $n^{th}$ percentile includes, given a sampling rate r and a billing period b, storing the largest $(1-n)*b*r$ samples during a billing period.

The assessing is done on a set of two or more links that, in some embodiments of this invention, are the same as the set of two or more links being monitoredIn some embodiments, the two sets are equal; In some embodiments, the two sets may overlap; yet in other embodiments, they can be different. In some embodiments, the load utilization of the set of links used for the assessing can be deduced from the load utilization of the set of links that are used for the monitoring. For example, in some embodiments of this invention, the utilization on the links that are monitored can be equal to the utilization on the links that are assessed.

In some embodiments of this invention, forwarding decisions are adjusted as to control load. In some embodiments of this invention, forwarding decisions are adjusted as to strike an adequate balance between load control and performance.

In such embodiments, assessing includes at least partly an assessment of load and/or an assessment of performance. In some embodiments, load and performance information can be combined in a metric that can be used to rate one or more of the two or more links in the network. In some embodiment, metrics can be computed for one or more links for objects controlled by forwarding decisions based at least partly on performance information for these objects on the one or more links; the metric for each of these links can then be penalized by an amount that is based, at least partly on the desired utilization of the one or more links. In some embodiments, the penalty associated for at least one of the one or more links can be at least partly fixed; in other embodiments, at least one of the one or more penalty values corresponding to the one or more links can be at least partly variable.

In some embodiments of the invention, the objects controlled by the forwarding are prefixes. In some embodiments of the invention, the objects controlled by the forwarding are flows. In some embodiments of the invention, the objects controlled by the forwarding are network applications.

In some embodiments of this invention, computing the object penalties of the one or more links is based at least partly on the amount the corresponding metric needs to be degraded by so that the metric on this link is deemed unacceptable. In some embodiments, the standard of unacceptability is based at least partly on the concept of a winner set, the width of this set including metric values that are deemed acceptable. First degree of unacceptability functions In some embodiments of this invention, the assessing includes generating one or more sets of functions, wherein at least one function in the one or more sets of functions gives a first degree of unacceptability of at least one link from the first subset of two or more links, wherein the first degree of unacceptability is based at least partly on utilization of the at least one link in the network.

In some embodiments of this invention, at least one function in the one or more sets of functions outputs at least a varying value. In some embodiments, at least one function in the one or more sets of functions is continuous or piecewise continuous with respect to utilization. In some embodiments, the at least one function in the one or more sets of functions is non-decreasing with respect to load.

Figure 7:
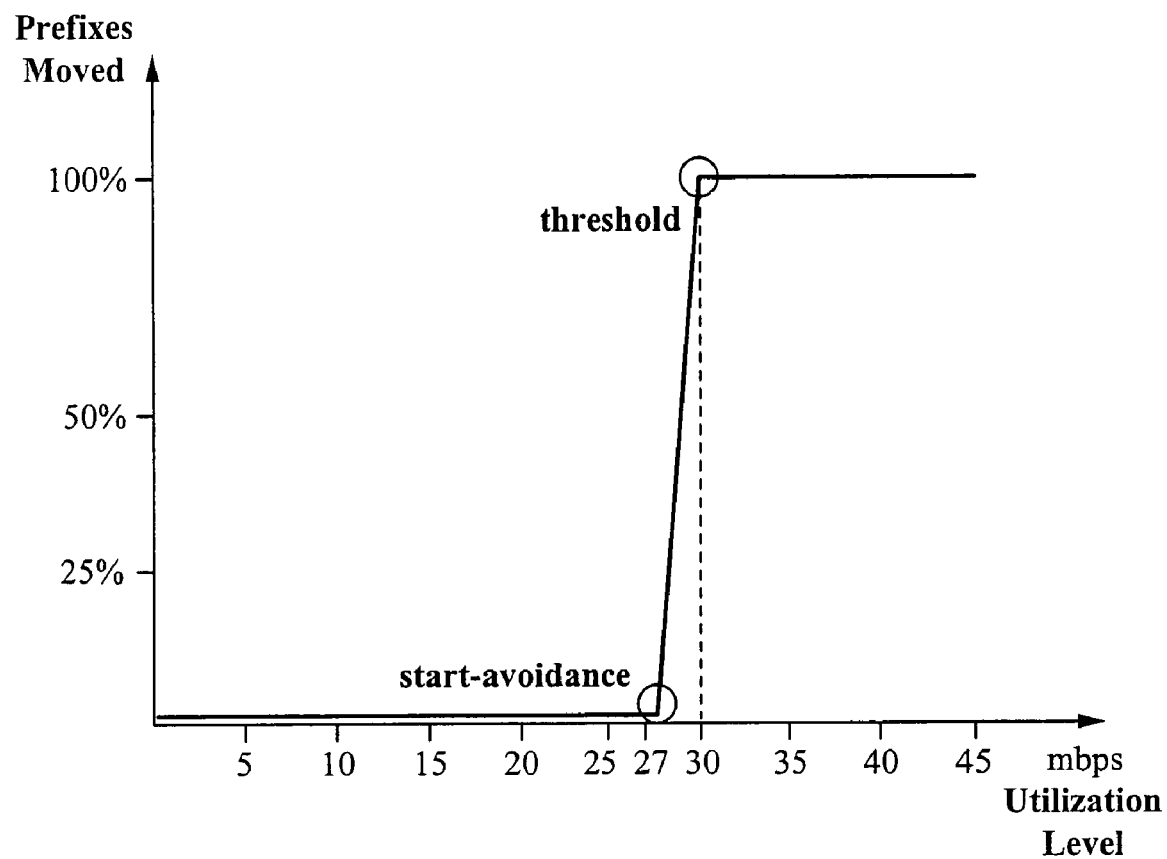
FIG. 7 illustrates an example of a first degree of unacceptability function.

In some embodiments of the invention, at least one degree of unacceptability function in the at least one set of degree of unacceptability functions receives at least one input, the at least one input at least partly depending on load, wherein the at least one degree of unacceptability function outputs at least:

1) a first constant value for values of the at least one input ranging from a second constant value to an third constant value
2) a linear function of at least one input for values of the at least one input ranging from the third constant value to a fourth constant value
3) a fifth constant value when the values of the at least one input exceeds the fourth constant value In some embodiments, the first degree of unacceptability function can be computed as follows: (We denote the first degree of unacceptability p.)

p=0 if load<=startAvoidance p=maxProbability*(load−startAvoidance)/(maxAvoidance−startAvoidance) if startAvoidance<load<=maxAvoidance p=maxProbability if load>maxAvoidance (See FIG. 7, wherein threshold=maxAvoidance.)

FIG. 7 illustrates an example of a first degree of unacceptability function.

In some embodiments of the invention, at least one degree of unacceptability function in the at least one set of functions receives at least one input, the at least one input at least partly depending on load, wherein the at least one degree of unacceptability function outputs at least:

1) a first constant value for values of the at least one input up to a threshold value
2) a second constant value for values of the at least one input above the threshold value In some embodiments, the first degree of unacceptability function can be computed as follows: (We denote the first degree of unacceptability p.)

p=0 if load<=avoidance p=maxProbability if load>avoidance

The load value is based at least partly on the monitoring. In some instances of the invention, the load value is based at least partly on inbound utilization. In some instances of the invention, the load value is based at least partly on outbound utilization. In some embodiments of the invention, load value is based at least partly on max(inbound,outbound); in some instances of the invention, load value is based at least partly on avg(inbound,outbound); in some instances of the invention, the load value is based at least partly on inbound+outbound. In some instances of the invention, the load value can be based on the instantaneous load values that result from the monitoring. In some instances of the invention, the load values are based at least partly on a percentile of a subset of load values that result from the monitoring. In some instances of the invention, the load values are based at least partly on the average of a subset of load values that result from the monitoring.

In some embodiments of the invention, different first degrees of unacceptability curves are applied to different forwarding decisions. More than one degree of unacceptability can exist. Selection of a set of functions can be done per forwarding decision. In some embodiments of the invention, no degree of unacceptability is applied to at least one link for at least one forwarding decision. For example, not all functions that are being assessed must have one or more sets of functions assigned to them.

In some instances, the assessing also includes the computation of a second degree of unacceptability for a link that can be dependent at least partly on the first degree of unacceptability. In some embodiments, determining of the second degree of unacceptability includes treating the first degree of unacceptability as a probability value, and assigning, using the probability value, one of a plurality of states to the second degree of unacceptability. In some such embodiments, the second degree of unacceptability can be assigned two states, that we denote here "hot" and "cold" based at least partly on the result of a random selection based at least partly on the first degree of unacceptability.

In some embodiments of the invention, the winner sets are constructed in an ordered list of one or more winner sets, where the elements of a winner set are links from the set of two or more links. In such embodiments, the elements of a winner set are comparable in quality for an object influenced by the forwarding decisions. In such embodiments, links that have a second degree of unacceptability that is large enough are not included in at least one winner set. In the instances of the invention in which the second degree of unacceptability includes one of the two states, "hot" and "cold", hot links are removed from at least one winner set in a list of one or more winner sets.

In some instances of the invention, the ordered list of one or more winner sets includes two winner sets, denoted the basic winner set and the extended winner set. If such instances also include a second degree of unacceptability that includes two states, "hot" and "cold", and if, for an object, the basic winner set is empty and the extended winner set is non-empty, then the forwarding decision that influences this object is adjusted to point to at least one of the one or more links in the extended winner set. In some embodiments of the invention, all winner sets are empty in the ordered list of winner sets, no adjustment is done for this object, and an attempted adjustment may be done to the following object. In other embodiments, an adjustment is performed that is based solely on performance. In other embodiments, a new ordered list of winner sets is constructed, based on a new set of first degree of unacceptability functions for each link. (See the section on more than one set of functions.). In other embodiments, one or more links in the set of two or more links can be chosen using a probabilistic approach. In one such embodiment, one link in the set of two or more links can be chosen randomly among the various links in the set of two or more links. In such embodiments, the probability density function used for the random selection can be biased towards some links and away from other links, based at least partly on the monetary cost of the one or more links. When all winner sets are empty in the ordered list of winner sets, other possible choices of action will be visible to those skilled in the art.

In some embodiments, assessing is based at least partly on monitoring a degree of suboptimality with respect to one or more monetary billing structures of a subset of two or more links in the network, wherein:

at least one of the one or more monetary billing structures receives as input at least a utilization of the subset of two or more links, and at least one of the one or more monetary billing structures includes at least variable cost.

The monetary billing structures are applied to a set of two or more links that, in some embodiments of this invention, are related to the set of two or more links being assessed.

Monetary billing structures can include one or more rules which determine a monetary bill resulting from the use of network links.

In some embodiments, the two sets are at least partly equal and/or unequal; in some embodiments, the load utilization of the set of links on which the monetary billing structures are based can be deduced from the load utilization of the set of links that are used for the assessing. For example, in some embodiments of this invention, the utilization on the links that are monitored can be equal to the utilization on the links on which the monetary billing structures are based. In some embodiments, the utilization of the links that are monitored overlap the utilization on the links on which the monetary billing structures are based. In yet other embodiments, the utilization of the links that are monitored are different from the utilization of the links on which the monetary billing structures are based.

Suboptimality can mean the existence of a state, and/or can mean the degree of a state, respect to one or more of the monetary billing structures, such that the cost of operating the network, as given by the monetary billing structures, is not minimized. Reducing the suboptimality with respect to one or more of the monetary billing structures therefore includes minimizing the discrepancy between the current load distribution and the optimal load distribution for which the cost of operating the network is minimized.

In some embodiments, at least one of the one or more monetary billing structures receives as input at least a utilization of at least one link from the second subset of two or more links, wherein the utilization may be determined over time. In some embodiments, the utilization is computed at least partly from at least one of: 1a) a maximum and 1b) an average, of at least one of: 2a) one or more percentiles and 2b) one or more averages, of one or more sets of utilization samples of the at least one link from the second subset of two or more links. In some embodiments, the billing structure is based on some amount such as a percentage, e.g. 95%, of the link utilization, measured over a billing period. In some embodiments, the billing period is equal to a regular period, such as a month, week, day, hour, or fraction or multiple thereof. In some embodiments, load is controlled by taking into account, at least partly, the same formula used in utilization for billing. For example, in the instance where the billing structure is based on the 95% of a link utilization, some embodiments of the invention can choose to only react when some estimation of the 95% of the link utilization is about to jump beyond a value that could cause in an increase in the bill. In some such embodiments, this can be achieved by having the first degree of unacceptability only increase once such thresholds are reached. Once such a threshold is exceeded, a second set of first degree of unacceptability functions are used, where the threshold now becomes the next point in the billing structure for the link where the bill increases again.

In some embodiments of this invention, the billing structures are based at least partly on the $95^{th}$ percentile of a function of both the inbound and outbound load of the at least one link. In some embodiments, the function of both the inbound and outbound load is a combining function, such as the averaging function.

In some embodiments, the billing structures are based at least partly on a function of both the $95^{th}$ percentile of the inbound load and the $95^{th}$ percentile of the outbound load. In some embodiments, the function of both the $95^{th}$ percentile of the inbound load and the $95^{th}$ percentile of the outbound load is the averaging function; in some embodiments, the function of both the $95^{th}$ percentile of the inbound load and the $95^{th}$ percentile of the outbound load is the max function.

The $95^{th}$ percentile value is illustrative. Other values in the range of 0-100%, or an absolute, non-percentage-based value, can be used.

In some embodiments of this invention, the assessing is done using more than one set of functions. In some embodiments, the system would select, for a given object, a first set of functions from the one or more sets of functions; if the first degree of unacceptability fails a threshold of acceptable unacceptability for all functions in the set of functions, then a second set is chosen. In some embodiments, one example of a degree of unacceptability can be a degree of unacceptability. In some embodiments, one example of a threshold of acceptable unacceptability can be a threshold of unacceptability. In some embodiments, examples of failing a threshold of acceptable unacceptability can include any of: passing a threshold of unacceptable unacceptability, failing a threshold of unacceptable acceptability, and/or passing a threshold of acceptable acceptability.

Alternatively, in some embodiments where performance considerations also taken into account, so that the assessing is further based at least partly on quality characterizations of the one or more objects, then the assessing further includes selecting at least one object from the one or more objects, selecting at least one set of functions from the one or more sets of functions, and constructing one or more winner sets for the at least one object and the at least one set of functions, wherein each winner set from the one or more winner sets includes a corresponding quality characterization threshold, wherein constructing includes:

1. including in at least one of the one or more winner sets one or more links from the subset of two or more links, 2. excluding, from the at least one or more winner sets, links for which the quality characterizations of the at least one object fails the corresponding quality characterization threshold included by each winner set from the one or more winner sets 3. excluding, from the at least one or more winner sets, unwanted links, wherein the unwanted links have a degree of unacceptability failing a threshold of acceptable unacceptability, wherein the degree of unacceptability is based at least partly on the first degree of unacceptability given by the at least one set of functions In various embodiments, an example a quality characterization can indicate quality and/or lack of quality. In some embodiments, an example of failing a quality characterization threshold can be passing a quality characterization.

Finally, in such embodiments, the links that are selected are from the a non-empty winner set from the one or more winner sets, wherein the non-empty winner set has a low corresponding quality characterization threshold (such as a lowest corresponding quality characterization threshold) from all corresponding quality characterization thresholds included by all winner sets from the one or more winner sets.

In such embodiments, the excluding, from the at least one or more winner sets, links for which the quality characterizations of the at least one object fails the corresponding quality characterization threshold included by each winner set from the one or more winner sets can include:

identifying at least one best link from the one or more links from the third subset of two or more links, wherein the at least one best link has a high quality characterization from at least one of the one or more links from the third subset of two or more links, and—determining the corresponding quality characterization threshold based at least partly on the high quality characterization.

In such embodiments, the selection of a second set can also occur when the constructing of the first one or more winner sets corresponding to the first set of functions yields all empty winner sets. In this case, a second set of functions from the one or more sets of functions is chosen, and a second one or more winner sets is constructed for the second set of functions from the one or more sets of functions In some embodiments, the one or more sets of functions are ordered into an ordered list of, for example, functions that are nontrivial to the embodiment. In this case, the first and second sets of functions referred to above are adjacent in the ordered list of the one or more sets of functions. Adjacent functions can have in between one or more functions that are trivial to the embodiment.

In some embodiments, the ordering includes the following steps:

computing the first degree of unacceptability function using the following function of load: (We denote the first degree of unacceptability p.)

$p=0$ if load<=startAvoidance $p=maxProbability*(load-startAvoidance)/(maxAvoidance-startAvoidance)$ if startAvoidance<load<=maxAvoidance $p=maxProbability$ if load>maxAvoidance computing, for each set of functions in the one or more sets of functions, a level, wherein a level is based at least partly on a sum of maxAvoidance values across the one or more functions in each set of functions performing the ordering based at least partly on the level computed for each set of functions In some embodiments, the approach above is combined in a table that we denote the threshold table. In some embodiments, the table consists of multiple rows, wherein each row in the table includes information regarding one set of functions, i.e., corresponding to one level. For each set of functions, the parameters corresponding to each function are described. If the functions include a minAvoidance and maxAvoidance as described above, then the minAvoidance and maxAvoidance parameters are included in the row for each function. In addition, if assessing is based at least on a second degree of acceptability, then in some embodiments, the value of the second degree of acceptability can also be stored along with each function. Each set of functions includes functions for a number of links in the network.

In some embodiments, one level is selected at any one time. In some embodiments, the selection includes the following steps:

compute a total load across links of interest.

Select the minimum level that is larger than the total load.

In some embodiments, the example below applies: if the total load is 90, the probability of rejection for link L1 will be computed using start-avoidance 40, max-avoidance 44. The (x, y) pairs represent the minAvoidance and maxAvoidance for each function for each set of functions corresponding to each level.

| | Load threshold table | | |
| --- | --- | --- | --- |
| | link L1 | link L2 | link L3 |
| level 85 | (30, 35) | (20, 25) | (20, 25) |
| level 94 | (40, 44) | (20, 25) | (20, 25) |
| level 132 | (40, 44) | (40, 44) | (20, 44) |

In some embodiments of this invention, a function for at least a link receive for input at least one of the values of outbound loads for the at least one link.

In some embodiments of this invention, a function for at least a link receive for input at least one of the values of inbound loads for the at least one link.

In some embodiments of this invention, a function for at least a link receive for input at least one of the values of a combination of inbound loads and outbound loads for the at least one link.

In some embodiments, the system, upon receipt of a new load sample on a link, can do the following:
  Update the load info on the link
  Select the active level on each load-threshold-table based on the updated sampled total load
  Update the first degree of unacceptability for the link, for the active level Some embodiments of this invention have different sets of functions for different objects.

In some embodiments, when the monitoring results in a new load sample that triggers a change in the active level, the assessing also includes re-computing the first degree of unacceptability based at least partly on the new level.

In some embodiments of this invention that include a second degree of unacceptability that includes two states "hot" and "cold", the assessing includes at least one of the following steps:
  evaluating the value of the second degree of unacceptability based at least partly on treating the first degree of unacceptability as a probability value, and assigning, using at least the probability value, one of "cold" and "hot" to the second degree of unacceptability.
  Excluding from the winner set the links that are "hot"
  If the winner set is empty after excluding the hot links, an extended winner set having a larger winner set width is used.
  Excluding from the extended winner set the links that are "hot"
  If the extended winner set is empty after the excluding of the hot links, various embodiments can do different things:
    In some embodiments, the system selects another object in the list.
    In some embodiments, a selection of a link based solely or primarily on the quality characterization of the links is done.
    In some embodiments, if none of the probabilities derived from the first degree of unacceptability functions are larger than one for all the links in the performance-only winner set (prior to the excluding steps above), at least one of the following steps is included:
      For those links in the performance-only winner set for which the probability is less then one, reevaluate the probabilities until at least one links' second degree of unacceptability is assigned the "cold" state.
      Select at least one link from the one or more links that are assigned the "cold" state.
    In some embodiments, move to the set of functions corresponding to the next level, and re-evaluate the second degree of unacceptability for this next set of functions.
    In some embodiments,
      For those links in the performance-only winner set for which the probability is less then one, reevaluate the probabilities until at least one of links' second degree of unacceptability is assigned the "cold" state.
      Select at least one link from the one or more links that are assigned the "cold" state.
    In some embodiments, select from any subset of the links at random
    In some embodiments, compute a second probability based on a first degree of unacceptability assigned to each link, wherein the second probability is based at least partly on the distance between one and the value of the first degree of unacceptability. In some embodiments, the following example applies: if the first degrees of unacceptability for two links are 0.9 and 0.8, respectively, then assign to the two links a second probability value proportional to 1-0.9=0.1 and 1-0.8=0.2, respectively, leading to a second probability value of 0.5 and 1 for the two links, respectively. In some embodiments, the second probability corresponds to the probability for the link to be "cold".

In some embodiments of this invention, the set of functions from which one derives the first degree of unacceptability based at least partly on the monetary billing structures.

In such embodiments, assessing includes generating, from at least one of the one or more monetary billing structures, one or more sets of functions, wherein at least one function in the one or more sets of functions gives a first degree of unacceptability of at least one link from a subset of two or more links, wherein the first degree of unacceptability is based at least partly on a utilization of the at least one link from the subset of two or more links.

In some embodiments, the generating of the sets of functions includes
  compiling a list of sums of loads (i.e., total load), wherein at least one sum of the list adds up the different combinations of load on the links,
  determining, for different values of total load, an optimal utilization distribution based at least partly on the at least one of the one or more monetary billing structures, and
  constructing the one or more sets of functions based at least partly on the utilization distribution In some embodiments, determining the optimal utilization involves solving for the minimum monetary cost of operating the network, with respect to the at least one of the one or more monetary billing structures In some embodiments, determining the optimal utilization involves a steepest descent strategy with respect to the at least one of the one or more monetary billing structures. (See example on steepest descent approach.)

In some embodiments of this invention, the determining of the adequate set of functions includes at least one of the following steps:
  1. Determining an estimate of the sum of the individual amounts, e.g., 95th percentiles, from prior billing intervals
  2. Round the estimate up by approximately one billing interval (e.g., 3 Mbps)
  3. Using a calculation program (e.g., Excel, Mathematica) to figure out the best allocation of the estimated load, and assigning the level and the maxAvoidance values based at least partly on the estimated load
  4. For at least one other level, assigning the max avoidance of one of the functions in the level to be the link capacity.

In some embodiments, Step 4 can be repeated for all links of interest.

In some embodiments, if the number of links that include first degree of unacceptability functions is N, then we have N+1 levels.

In some embodiments, if the number of links that include first degree of unacceptability functions is N, then we have at most N levels.

Those skilled in the art will recognize other ways of constructing the sets of first degree of unacceptability functions based on the billing structures.

In some embodiments of this invention, startAvoidance and maxAvoidance are related as follows:

StartAvoidance=maxAvoidance*(1-percentageBelow-Max)

In some embodiments of the invention, the problem of finding an optimal load distribution can be posed as a linear programming problem. That is, given:

N the total number of links $C(x_1), C(x_2), \ldots, C(x_N)$ the cost function of each link as a function of the load on each of these links $x_1, x_2, \ldots$ and x the total load, Find $x_1, x_2, \ldots, x_N$ (the load on each of the links) such that:
1. $x_1 + x_2 + \ldots + x_N = x$
2. $x_1, \ldots, x_N \geq 0$
3. $C(x_1) + C(x_2) + \ldots + C(x_N)$ is minimized In some embodiments of this invention, linear programming techniques can be applied to solve this problem.

One can take advantage of the cost functions on the links, and the fundamental theorem of linear programming, to transform the search of target loads in a table lookup. The fundamental theorem of linear programming states that optimal points in an optimization problem are extreme points of the feasible regions, that is the regions where a valid solution can be found. A valid solution is a combination of load values such that the cost is optimal, for a given total load. Linear programming algorithms such as the simplex algorithm speed up the calculation of solutions by restricting the search for optimal values on the set of extreme points only.

In some embodiments, the problem can be converted into a table lookup using a heuristic approach. In some such embodiments, for each load sample, a table of optimal solutions is stored, wherein the table of optimal solutions includes the combinations of load values that lead to optimal cost. In some embodiments, the appropriate row is retrieved each time a new load sample comes in. In some embodiments, the choice of the optimal solution is based on a proximity factor, wherein the proximity factor selects the optimal solution that minimizes the load changes among links, for the current combination of individual loads that lead to the total load that's being looked up. In some embodiments, the proximity factor can be based on at least one of the following functions:

$$PF(OPj) = \text{sum } i \; (\text{current\_load}\_i - \text{target\_load}j\_i)^2$$
square error $$OP = \min j \; PF(OPj) \text{ least square error}$$

In some embodiments, computing this table is a one-time effort. In some embodiments, the computation of this table is done off-line. In some embodiments, the computation of this table is done periodically. In some embodiments of this invention, the computation of this table is triggered by an external event.

In some embodiments, determining the optimal utilization involves a steepest descent strategy with respect to the at least one of the one or more monetary billing structures.

In some embodiments of the invention, the one or more sets of function that give a first degree of unacceptability use at least one of the following:
1) Defining the first load tier to be the minimum commit level of all providers
2) Defining the next bandwidth level by selecting the provider that represents the smallest incremental cost increase. In some embodiments of the invention, utilize that provider for the full duration of that cost tier.
3) In some embodiments, in instances where the incremental cost increase is identical, select the provider that maintains that billing level for the longest duration (greatest capacity.)

In some embodiments of this invention, Steps 2 and 3 are repeated. In some embodiments of this invention, Steps 2 and 3 are repeated until the maximum cost tier is reached for all providers. In some embodiments, the maximum cost tier constitutes the physical link capacity In some embodiments, a set of function in the one or more sets of functions that give the first degree of unacceptability is set at the actual level of transition, wherein the actual level of transition is based at least partly on the provider's billing model. In some embodiments, it is not necessary to cautiously set thresholds lower than the actual provider bandwidth tiers. In some embodiments, the maxAvoidance is set to the actual transition levels for all links. In some embodiments, startAvoidance is set to an amount, such as 10% lower than the true threshold. In some embodiments, a value for startAvoidance is selected automatically.

For this example, we will assume that the enterprise has active links to three service providers, who bill according to the following utilization tiers:

|  | usage level | cost |
|---|---|---|
| Service Provider 1 | | |
| minimum commitment: | up to 10 mbps | $100 |
| billing tier 1 | 11-20 mbps | $250 |
| billing tier 2 | 21-45 mbps | $400 |
| Service Provider 2 | | |
| minimum commitment: | up to 10 mbps | $150 |
| billing tier 1 | 11-15 mbps | $200 |
| billing tier 2 | 16-45 mbps | $350 |
| Service Provider 3 | | |
| minimum commitment: | up to 5 mbps | $200 |
| billing tier 1 | 6-40 mbps | $300 |
| billing tier 2 | 41-45 mbps | $450 |

Figure 8:
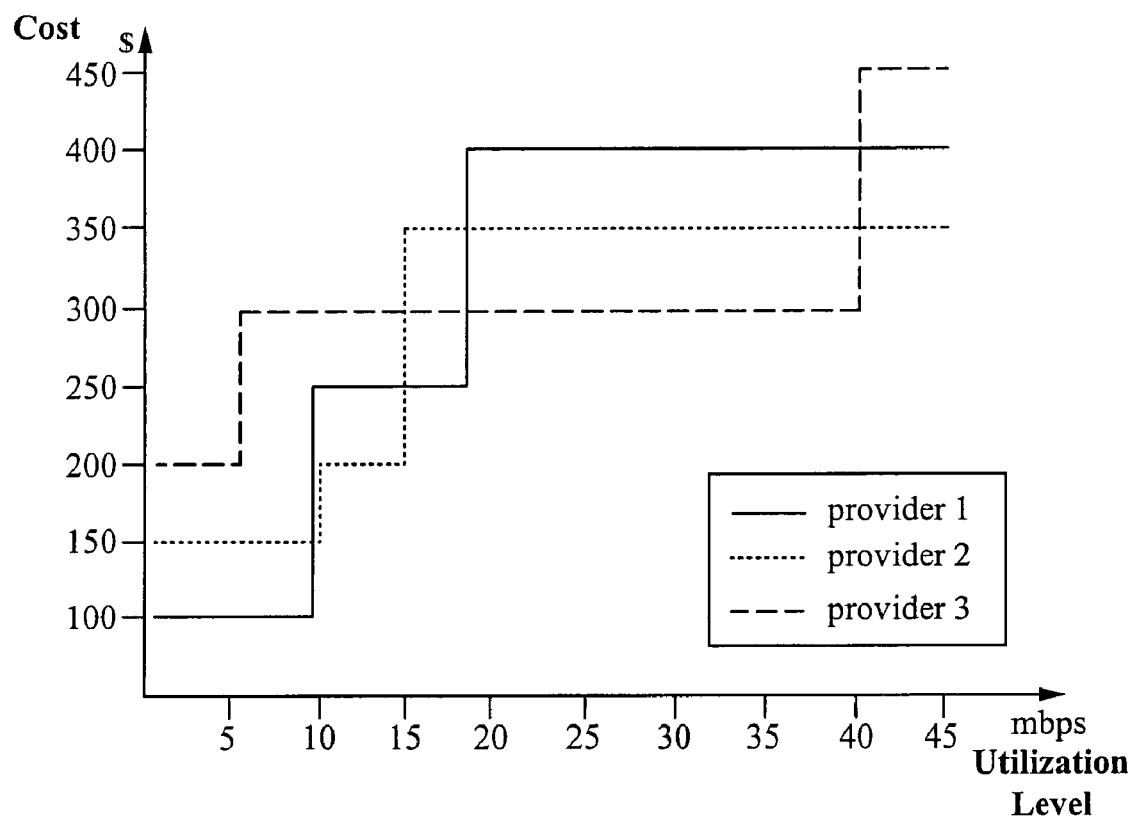
FIG. 8 illustrates an example of monetary billing structures.

FIG. 8 illustrates an example of monetary billing structures.

Following the implementation steps above, as used by some embodiments of the invention, the chart above would yield the following load tiers for some embodiments of the invention:

| level (aggregate bandwidth) | provider 1 | provider 2 | provider 3 |
|---|---|---|---|
| Tier 1 | 25 | 10 | 10 | 5 |
| Tier 2 | 30 | 10 | 15 | 5 |
| Tier 3 | 65 | 10 | 15 | 40 |
| Tier 4 | 95 | 10 | 45 | 40 |
| Tier 5 | 105 | 20 | 45 | 40 |
| Tier 6 | 130 | 45 | 45 | 40 |
| Tier 7 | 135 | 45 | 45 | 45 |

Tier 1: In some embodiments of this invention, the first tier is configured to make optimal use of the minimum commit level of each provider. In some embodiments, the level value is simply the sum of all provider thresholds.

Tier 2: In some embodiments of this invention, the second tier is configured to use provider 2 for any traffic that exceeds the minimum commit levels of tier (1). In some embodiments, Provider 2 was selected by comparing the incremental cost increase of all three providers at the next utilization level, and selecting the cheapest:

provider 1: $100→$250=$150 increase
provider 2: $150→$200=$50 increase
provider 3: $200→$300=$100 increase In some embodiments, once provider 2 is identified, it is utilized to its full capacity at the next cost tier. In this example, provider 2 is used until that link approaches 15 mbps.

Tier 3: In some embodiments, if bandwidth utilization exceeds the 30 mbps aggregate of tier (2), the same heuristic is used to determine the next provider to bear an increase on tier (3):

provider 1: $100→$250=$150 increase
provider 2: $200→$350=$150 increase
provider 3: $200→$300=$100 increase In this example, provider 3 will be the next link utilized. Provider 3 is utilized to its full capacity at this cost level, which is 40 mbps.

Tier 4: In this example, at tier (4), there is a tie among the cost increments:

provider 1: $100→$250=$150 increase
provider 2: $200→$350=$150 increase
provider 3: $300→$450=$150 increase In such a case, in some embodiments, the provider that provides the most capacity at the next billing level is selected.

In this example, Provider 2's cost remains at this cost level from 15 mbps-45 mbps, which is the longest duration of the three.

Tier 5: In this example, at tier (5), Provider 1 is selected using the same logic as tier (4).

Tier 6: In this example, note that although provider 1 is again selected at tier (6), this tier is not combined with tier (5).

Tier 7: In this example, the last tier represents the full link capacity of each provider.

Adjusting can be done automatically to a subset of the forwarding decisions of one or more forwarding nodes in the network based at least partly on the assessing, wherein:

at least one forwarding decision from the subset of the forwarding decisions points to at least one link from a subset of two or more links in the network, the adjusting attempts to reduce the degree of suboptimality "Automatic" adjustment may mean that human intervention may not be required prior to completing a change of forwarding decision.

In some embodiments of the invention, systems are included to prevent flapping that could incur from repeated adjustments of forwarding decisions. In some embodiments, a minimum limit can be imposed on the interval separating consecutive reevaluations of one or more of their first and second degrees of unacceptability for an object. In embodiments of the invention in which the second degree of unacceptability for an object includes the states "hot" and "cold", a minimum limit can be imposed on the interval separating consecutive hot/cold reevaluations. (In the context of this document, we denote the minimum time to reevaluate degrees of unacceptability the "reevaluation interval" for the object.) In some embodiments of this invention, the reevaluation interval can be chosen randomly with respect to some probability distribution function. In some embodiments of the invention, the reevaluation interval is chosen as to be larger than the minimum interval between two consecutive monitoring actions. In some such embodiments in which the second degree of unacceptability includes the states "hot" and "cold", the probability distribution functions in respect to which the reevaluation interval are computed can be chosen differently for hot to cold transitions, and cold to hot transitions, respectively. In some such embodiments, the probability distribution function for cold to hot transitions has a lower median than the probability distribution function for hot to cold transitions.

In some embodiments of the invention, the probability distribution function with respect to which the reevaluation interval is computed can include an exponential distribution function. In some embodiments, a minimum limit can be imposed on the range of values that is allowed by the distribution. In some embodiments, a maximum limit can be imposed on the range of values allowed by the distribution.

In some embodiments of this invention, the subset of two or more forwarding decisions in the network that are to be adjusted automatically does not consist of all forwarding decisions. Load often varies randomly in unpredictable ways. Computing a target that provides an optimal solution to the problem, and adjusting the forwarding decisions to meet this target seldom leads to the optimal solution, because the conditions at the time when the target was computed, and at the time the forwarding decisions were adjusted are not the same.

Therefore, in some embodiments of this invention, the incremental approach is used, wherein a subset of the forwarding decisions are selected for adjustment at any one time. In some embodiments, continuously monitoring and assessing, and continuously adjusting in an incremental fashion a subset of the forwarding decisions allows for stable load movements towards the optimal load distribution.

In some embodiments of this invention, the subset of the forwarding decisions of one or more forwarding nodes is done automatically. In some embodiments of this invention, the selecting of the subset of the forwarding decisions is random In some embodiments, the selecting of the subset of the forwarding decisions is independent from the assessing.

In some embodiments, the selecting of the'subset of the forwarding decisions uses a flow monitoring device In some embodiments of this invention, at least one forwarding decision from the subset of the forwarding decisions at least partly influences one or more objects, wherein the one or more objects includes at least one of a prefix, a flow, and a network application; in some such embodiments, the assessing is further based at least partly on quality characterizations of the one or more objects, wherein the quality characterizations are with respect to at least one link from the third subset of two or more links. In some such embodiments, the selecting of the subset of the forwarding decisions is based at least partly on a measuring of the quality characterizations of the one or more objects.

In some embodiments, the selecting of the subset of the forwarding decisions is based at least partly on a source external to the third subset of two or more links.

In some embodiments of this invention, the forwarding decisions of the one or more forwarding nodes are described at least partly by at least one Layer 3 Protocol In some embodiments of this invention, at least one of the forwarding decisions of the one or more forwarding nodes are described at least partly by at least one Internet Protocol (IP).

In some embodiments of this invention, the forwarding decisions of the one or more forwarding nodes are described at least partly by at least one Layer 2 Protocol In some embodiments of this invention, the adjusting is described at least partly by at least one Border Gateway Protocol (BGP)

In some embodiments of this invention, the adjusting is described at least partly by Border Gateway Protocol (BGP) Version 1

In some embodiments of this invention, the adjusting is described at least partly by Border Gateway Protocol (BGP) Version 2

In some embodiments of this invention, the adjusting is described at least partly by Border Gateway Protocol (BGP) Version 3

In some embodiments of this invention, the adjusting is described at least partly by Border Gateway Protocol (BGP) Version 4

What is claimed is:

1. A computer-usable medium having computer-readable instructions stored thereon for execution by a processor to perform a method to ensure a desired load distribution in a network, the method comprising:
   monitoring of at least a first utilization of a first subset of two or more links in the network;
   assessing, base at least partly on the monitoring, of a degree of suboptimality with respect to the desired load distribution, wherein the degree of suboptimality corresponds to a measurable difference between a performance of determined load distribution and a performance of the desired load distribution, the assessing including:
   generating at least two sets of functions; and
   selecting a first set of functions from the at least two sets of functions:
      wherein at least one function from the first set of functions gives a first degree of unacceptability of at least one link from the first subset of two or more links, wherein the first degree of unacceptability is based at least partly on a second utilization of the at least one link from the first subset of two or more links, wherein the first degree of unacceptability corresponds to a probability that adjusting a subset of forwarding decisions of one or more forwarding nodes in the network will decrease the measurable difference; and
   the at least one function in the first set of functions outputs at least a varying value; and
   selecting of a second set of functions from the at least two sets of functions if, for each function in the first set of functions that gives the first degree of unacceptability, the first degree of unacceptability fails a first threshold test; and
   adjusting, automatically, of a subset of forwarding decisions of one or more forwarding nodes in the network based at least partly on the assessing:
      wherein at least one forwarding decision from the subset of the forwarding decision corresponds to at least one link from a second subset of two or more links in the network; and
      the adjusting includes attempting to reduce the degree of suboptimality.

2. The computer-usable medium of claim 1, wherein the first utilization and the second utilization are equal.

3. The computer-usable medium of claim 1, wherein the first utilization and the second utilization are unequal.

4. The computer-usable medium of claim 1, wherein at least one link from the first subset of two or more links is included in the second subset of two or more links.

5. The computer-usable medium of claim 1, wherein at least one link from the first subset of two or more links is not included in the second subset of two or more links.

6. The computer-usable medium of claim 1, wherein at least one of the monitoring, the assessing and the adjusting repeats.

7. The computer-usable medium of claim 1, wherein at least one of the forwarding decisions of the one or more forwarding nodes are described at least partly by at least one Layer 3 Protocol.

8. The computer-usable medium of claim 7, wherein at least one of the forwarding decisions of the one or more forwarding nodes are described at least partly by at least one Internet Protocol (IP).

9. The computer-usable medium of claim 1, wherein at least one of the forwarding decisions of the one or more forwarding nodes are described at least partly by at least one Layer 2 Protocol.

10. The computer-usable medium of claim 1, wherein the adjusting is described at least partly by at least one Border Gateway Protocol (BGP).

11. The computer-usable medium of claim 1, wherein the at least two sets of functions are generated from one or more monetary billing structures of a third subset of two or more links in the network.

12. The computer-usable medium of claim 11, wherein at least one link from the third subset of two or more links is included in at least one of: 1) the first subset of two or more links and 2) the second subset of two or more links.

13. The computer-usable medium of claim 11, wherein at least one link from the third subset of two or more links is not included in at least one of: 1) the first subset of two or more links and 2) the second subset of two or more links.

14. The computer-usable medium of claim 11, wherein at least one of the one or more monetary billing structures is for at least one Internet Service Provider (ISP).

15. The computer-usable medium of claim 11, wherein each link of at least one link from the third subset of two or more links has a third utilization, and at least one of the one or more monetary billing structures receives as input at least the third utilization.

16. The computer-usable medium of claim 15, wherein the first utilization of the first subset of two or more links is at least partly indicative of the third utilization of the third subset of two or more links.

17. The computer-usable medium of claim 15, wherein at least one of the first utilization and the second utilization is being determined over time.

18. The computer-usable medium of claim 17, wherein the third utilization is computed at least partly from
   at least one of: 1a) a maximum and 1b) an average;
   of at least one of: 2a) one or more percentiles and 2b) one or more averages;
   and of one or more sets of utilization samples of the at least one link from the third subset of two or more links.

19. The computer-usable medium of claim 17, wherein the at least one of the one or more monetary billing structures is continuous or piecewise continuous with respect to the third utilization.

20. The computer-usable medium of claim 15, wherein the generating includes:
   compiling a list of at least two sums, wherein at least one sum of the list adds at least two of the third utilizations;
   determining, for a subset of the list, a utilization distribution based at least partly on the least one of the one or more monetary billing structures; and
   constructing the at least two sets of functions based at least partly on the utilization distribution.

21. The computer-usable medium of claim 20, wherein the utilization distribution minimizes a monetary cost of operating the network, with respect to the at least one of the one or more monetary billing structures.

22. The computer-usable medium of claim 20, wherein the utilization distribution uses at least a steepest descent strategy with respect to the at least one of the one or more monetary billing structures.

23. The computer-usable medium of claim 1, wherein the monitoring uses one or more of Simple Network Monitoring Protocol (SNMP), flow information export, NetFlow, span port, and a source external to the first subset of two or more links.

24. The computer-usable medium of claim 1, wherein at least one function in the at least two sets of functions is continuous or piecewise continuous with respect to the second utilization.

25. The computer-usable medium of claim 1, wherein at least one function in the least two sets of functions is non-decreasing with respect to the second utilization.

26. The computer-usable medium of claim 1, wherein at least one function in the at least two sets of functions receives at least one input, the at least one input at least partly depending on the second utilization, wherein the at least one function outputs at least:
   1) a first constant value for values of the at least one input up to a threshold value; and
   2) a second constant value for values of the at least one input above the threshold value.

27. The computer-usable medium of claim 1, wherein at least one function in the at least two sets of functions receives at least one input, the at least one input at least partly depending on the second utilization, wherein the at least one function outputs at least:
   1) a first constant value for values of the at least one input ranging from a second constant value to a third constant value,
   2) a linear function of at least one input for values of the at least one input ranging from the third constant value to a fourth constant value, and
   3) a fifth constant value for values of the at least one input exceeding the fourth constant value.

28. The computer-usable medium of claim 1, wherein the adjusting includes attempting to reduce the degree of suboptimality based on least partly on the first degree of unacceptability.

29. The computer-usable medium of claim 28, wherein the adjusting further includes attempting to reduce the degree of suboptimality by changing at least one forwarding decision from the subset of the forwarding decisions, wherein:
   prior to the changing, the at least one forwarding decision from the subset of the forwarding decisions corresponds to at least a first link from the second subset of two or more links in the network;
   after the changing, the at least one forwarding decision from the subset of the forwarding decisions corresponds to at least a second link from the second subset of two or more links in the network; and
   wherein the first degree of unacceptability of the at least first link from the second subset is more unacceptable than the first degree of unacceptability of the at least the second link from the second subset.

30. The computer-usable medium of claim 1, wherein the assessing includes determining a second degree of unacceptability based at least partly on the first degree of unacceptability, wherein the second degree of unacceptability corresponds to a status of a link for routing over the network.

31. The computer-usable medium of claim 30, wherein the determining of the second degree of unacceptability includes treating the first degree of unacceptability as a probability value, and assigning, using the probability value, one of a plurality of states to the second degree of unacceptability.

32. The computer-usable medium of claim 1, further comprising:
   ordering the one or more sets of functions into an ordered list of the one or more sets of functions; and
   wherein the first set of functions and the second set of functions are adjacent in the ordered list of the one or more sets of functions.

33. The computer-usable medium of claim 32, wherein:
   at least one function in the one or more sets of functions received at least one input, the at least one input at least partly depending on the second utilization, wherein the at least one function outputs at least:
   1) a first constant value for values of the at least one input ranging from a second constant value to a third constant value;
   2) a linear function of at least one input for values of the at least one input ranging from the third constant value to a fourth constant value; and
   3) a fifth constant value for values of the at least one input exceeding the fourth constant value, further comprising:
       computing, for each set of functions in the one or more sets of functions, a level, wherein the level is based at least partly on a sum of at least the fourth constant values across the one or more functions in each set of functions; and
       performing the ordering based at least partly on the level computed for each set of functions.

34. The computer-usable medium of claim 32, wherein the sum of at least the fourth constant values across the one or more functions in each set of functions, sums at least one function of the one or more functions in each set of functions.

35. The computer-usable medium of claim 32, wherein the sum of the fourth constant values across the one or more functions in each set of functions, sums all functions of the one or more functions in each set of functions.

36. The computer-usable medium of claim 1, wherein at least one forwarding decision from the subset of forwarding decisions at least partly influences one or more objects, wherein the one or more objects includes one of a prefix, a flow and a network application.

37. The computer-usable medium of claim 36, wherein the assessing is further based at least partly on quality characterizations of the one or more objects, wherein the quality characterizations are with respect to at least one link from the second subset of two or more links.

38. The computer-usable medium of claim 36, wherein the assessing further includes:
   selecting at least one object from the one or more objects;
   selecting at least one set of functions from the one or more sets of functions; and
   constructing one or more winner sets for the at least one object and the least one set of functions, wherein each winner set from the one or more winner sets includes a corresponding quality characterization threshold, wherein the constructing includes:
   1) including in at least one of the one or more winner sets one or more links from the second subset of two or more links;
   2) excluding, from the at least one or more winner sets, links for which the quality characterizations of the at least one object fails the corresponding quality characterization threshold included by each winner set from the one ore more winner sets; and
   3) excluding, from the at least one or more winner sets, unwanted links, wherein the unwanted links have a second threshold of acceptable unacceptability, wherein the second threshold of acceptable unacceptability is based at least partly on the first degree of unacceptability given by the at least one set of functions; and selecting one or more links from a non-empty winner set from the one or more winner sets, wherein the non-empty winner set has a low corresponding quality characterization threshold from all corresponding quality characterization thresholds included by all winner sets from the one or more winner sets.

39. The computer-usable medium of claim 38, wherein the first threshold test and the second threshold test are equal.

40. The computer-usable medium of claim 38, wherein the first threshold test and the second threshold test are unequal.

41. The computer-usable medium of claim 38, wherein the low corresponding quality characterization threshold is the lowest corresponding quality characterization threshold from all corresponding quality characterization thresholds included by all winner sets from the one or more winner sets.

42. The computer-usable medium of claim 38, wherein:
the constructing of a first one or more winner sets is done for a third set of functions from the one or more sets of functions; and
the constructing of a second one or more winner sets is done for a fourth set of functions from the one or more sets of functions if:
1) the one or more sets of functions includes at least two sets of functions; and
2) all of the first one or more winner sets are empty.

43. The computer-usable medium of claim 38:
wherein the constructing of a first one or more winner sets is done for a first object from the one or more objects; and
the constructing of a second one or more winner sets is done for a second object from the one or more objects if:
1) the one or more objects includes at least two objects, and
2) all of the first one or more winner sets are empty.

44. The computer-usable medium of claim 38, wherein the excluding, from the at least one or more winner sets, links for which the quality characterizations of the at least one object fails the corresponding quality characterization threshold included by each winner set from the at least one or more winner sets is further comprised of:
identifying at least one best link from the one or more links from the second subset of two or more links, wherein the at least one best link has a high quality characterization from at least one or more links from a second subset of two or more links, and
determining the corresponding quality characterization threshold based at least partly on the high quality characterization.

45. The computer-usable medium of claim 44, wherein the high quality characterization is the highest quality characterization from the at least one of the one or more links from the second subset of two or more links.

46. The computer-usable medium of claim 1, further including selecting the subset of the forwarding decisions of one or more forwarding nodes automatically.

47. The computer-usable medium of claim 46, wherein the selecting of the subset of the forwarding decisions is at least partly random.

48. The computer-usable medium of claim 46, wherein the selecting of the subset of the forwarding decisions is independent from the assessing.

49. The computer-usable medium of claim 46, wherein the selecting of the subset of the forwarding decisions uses a flow monitoring device.

50. The computer-usable medium of claim 46,
wherein at least one forwarding decision from the subset of the forwarding decisions at least partly influences one or more objects, wherein the one or more objects includes at least one of a prefix, a flow, and a network application;
the assessing is further based at least partly on quality characterizations of the one or more objects, wherein the quality characterizations are with respect to at least one link from the second subset of two or more links; and
the selecting of the subset of the forwarding decisions is based at least partly on a measuring of the quality characterizations of the one or more objects.

51. The computer-usable medium of claim 46, wherein the selecting of the subset of the forwarding decisions is based partly on a source external to the second subset of two or more links.

52. The computer-usable medium of claim 1, wherein the computer code is at least partly software.

53. The computer-usable medium of claim 1, wherein the computer code is all software.

54. The computer-usable medium of claim 1, wherein the computer code is at least partly hardware.

55. The computer-usable medium of claim 1, wherein the computer code is all hardware.

56. The computer-usable medium of claim 1, wherein the performance is a cost incurred by a load distribution.

57. A network of nodes configured to ensure a desired load distribution in a network, the network comprising:
means for monitoring at least a first utilization of a first subset of two or more links in the network;
means for assessing, based at least partly on the means for monitoring, a degree of suboptimality with respect to the desired load distribution, wherein the degree of suboptimality corresponds to a measurable difference between a performance of determined load distribution and a performance of the desired load distribution, wherein the means for assessing is configured to:
generate a list of at least two sets of functions;
select a first set of functions from the list of at least two sets of functions
wherein at least one function from the first set of functions gives a first degree of unacceptability of at least one link from the first subset of two or more links, wherein the first degree of unacceptability is based at least partly on a second utilization of the at least one link from the first subset of two or more links, wherein the first degree of unacceptability is based at least partly on a second utilization of the at least one link from the first subset of two or more links, wherein the first degree of unacceptability corresponds to a probability that adjusting a subset of forwarding decisions of one or more forwarding nodes in the network will decrease the measurable difference, and at least one function in the first set of functions outputs at least a varying value, and
selecting a second set of functions from the at least two sets of functions if:
1) at least one function in the first set of functions gives the first degree of unacceptability; and
2) for each function in the first set of functions that gives the first degree of unacceptability, the first degree of unacceptability fails a first threshold test, and
means for adjusting automatically a subset of the forwarding decisions of one or more forwarding nodes in the network based at least partly on the means for assessing:
wherein at least one forwarding decision from the subset of the forwarding decisions corresponds to at least one link from a second subset of two or more links in the network, the means for adjusting attempts to reduce the degree of suboptimality.

58. A method of attempting to ensure a desired load distribution in a network, the method comprising
- monitoring at least a first utilization of a first subset of two or more links in the network;
- assessing, based at least partly on the monitoring, a degree of suboptimality with respect to the desired load distribution, wherein the degree of suboptimality corresponds to a measurable difference between a performance of determined load distribution and a performance of the desired load distribution, the assessing including:
- generating at least two sets of functions; and
- selecting a first set of functions from the at least two sets of functions
  - wherein at least one function from the first set of functions gives a first degree of unacceptability of at least one link from the subset of two or more links, wherein the first degree of unacceptability is based at least partly on a second utilization of the at least one link from the first subset of two or more links, wherein the first degree of unacceptability corresponds to a probability that adjusting a subset of forwarding decisions of one or more forwarding nodes in the network will decrease the measurable difference; and
- the at least one function in the first set of functions outputs at least a varying value;
- selecting a second set of functions from the at least two sets of functions if, for each function in the first set of functions that gives the first degree of unacceptability, the first degree of unacceptability fails a first threshold test; and
  - adjusting automatically a subset of forwarding decisions of one or more forwarding nodes in the network based at least partly on the assessing:
    - wherein at least one forwarding decision from the subset of the forwarding decision corresponds to at least one link from a second subset of two or more links in the network; and
    - the adjusting includes attempting to reduce the degree of suboptimality.

59. A method of controlling load distributions on a computer network having multiple nodes coupled by multiple links, the method comprising:
- monitoring load distributions on a first subset of the multiple nodes on the network;
- generating from one or more billing structures corresponding first and second sets of unacceptability functions, wherein the first set of functions is used to determine first amounts that measurable performances associated with the monitored load distributions differ from a first threshold and the second set of functions is used when the first amounts all exceed the first threshold and is used to determine second amounts that measurable performances associated with the monitored load distributions differ from a second threshold;
- wherein the first set of functions generates a probability value that a measure of a first use on a first subset of the multiple links has a value that differs from a threshold; and
- automatically adjusting forwarding decisions on a second subset of the multiple nodes based on the first or the second amounts, thereby controlling load distributions on the computer network.

60. The method of claim 59, wherein the first subset of nodes is different from the second subset of nodes.

61. The method of claim 59, wherein the first use corresponds to a load.

62. The method of claim 59, wherein the first use corresponds to a load on one of the multiple links per a capacity of the one link.

63. The method of claim 59, wherein the second set of functions assigns a link from the multiple links to one of two states, wherein the one of the two states corresponds to a winner set from which links are selected for forwarding.

64. The method of claim 59, wherein generating the first set of functions comprises:
- determining a list of sums of load, wherein at least one sum in the list corresponds to the sums of different combinations of load on the multiple links;
- determining, for different values of sums of load, an optimal distribution of use on one of the multiple links; and
- constructing the two sets of functions based at least partly on the optimal distribution of use.

* * * * *